(12) United States Patent
Jongewaard et al.

(10) Patent No.: US 10,983,394 B2
(45) Date of Patent: Apr. 20, 2021

(54) THIN DIRECT-VIEW LED BACKLIGHTS

(71) Applicants: Seoul Semiconductor Co., Ltd., Ansan-si (KR); InteLED Corp., Huntington Beach, CA (US)

(72) Inventors: Mark Jongewaard, Westminister, CO (US); William A. Parkyn, Huntington Beach, CA (US); David Pelka, Los Angeles, CA (US)

(73) Assignees: Seoul Semiconductor Co., Ltd., Ansan-si (KR); InteLED Corp., Huntington Beach, CA (US)

( * ) Notice: Subject to any disclaimer, the term of this patent is extended or adjusted under 35 U.S.C. 154(b) by 0 days.

(21) Appl. No.: 16/704,394

(22) Filed: Dec. 5, 2019

(65) Prior Publication Data

US 2020/0103707 A1    Apr. 2, 2020

Related U.S. Application Data

(63) Continuation of application No. 15/593,697, filed on May 12, 2017, now Pat. No. 10,503,010, which is a
(Continued)

(51) Int. Cl.
*G02F 1/13357* (2006.01)
*F21V 5/04* (2006.01)
(Continued)

(52) U.S. Cl.
CPC ........ *G02F 1/133606* (2013.01); *F21V 5/048* (2013.01); *F21V 5/08* (2013.01);
(Continued)

(58) Field of Classification Search
CPC ........ G02F 1/133606; G02F 1/133603; G02F 1/133611; G02F 2001/133607;
(Continued)

(56) References Cited

U.S. PATENT DOCUMENTS 7,348,723 B2    3/2008   Yamaguchi et al.
7,674,019 B2    3/2010   Parkyn et al.
(Continued)

FOREIGN PATENT DOCUMENTS

JP     2009-500663    1/2011
JP     2011-023204    2/2011
(Continued)

OTHER PUBLICATIONS

International Search Report dated Mar. 6, 2014, International Application No. PCT/US13/56234.
(Continued)

*Primary Examiner* — Bao Q Truong
(74) *Attorney, Agent, or Firm* — H.C. Park & Associates, PLC

(57) ABSTRACT

A light-emitting apparatus including a light-emitting element and a lens covering the light-emitting element. The lens includes an upper surface having a convex shape and a lower surface including a cavity to which light emitted from the light-emitting elements is incident, in which the cavity includes an apex facing an upper surface of the light-emitting element and configured to reduce Fresnel reflections emitted vertically.

16 Claims, 23 Drawing Sheets
(13 of 23 Drawing Sheet(s) Filed in Color)

Related U.S. Application Data continuation-in-part of application No. 14/943,685, filed on Nov. 17, 2015, now Pat. No. 9,880,417, which is a continuation of application No. 13/973,704, filed on Aug. 22, 2013, now Pat. No. 9,255,695.

(60) Provisional application No. 62/336,146, filed on May 13, 2016, provisional application No. 61/692,024, filed on Aug. 22, 2012.

(51) Int. Cl.
  *F21V 5/08* (2006.01)
  *G02B 19/00* (2006.01)
  *F21Y 115/10* (2016.01)

(52) U.S. Cl.
  CPC ..... *G02B 19/0014* (2013.01); *G02B 19/0061* (2013.01); *G02F 1/133603* (2013.01); *G02F 1/133611* (2013.01); *F21Y 2115/10* (2016.08); *G02F 2001/133607* (2013.01)

(58) Field of Classification Search
  CPC ....... F21V 5/048; F21V 5/08; G02B 19/0014; G02B 19/0061; F21Y 2115/10
  See application file for complete search history.

(56) References Cited

U.S. PATENT DOCUMENTS

| | | | |
|---|---|---|---|
| 7,798,679 | B2 | 9/2010 | Kokubo et al. |
| 8,025,429 | B2 | 9/2011 | Ho et al. |
| 8,227,969 | B2* | 7/2012 | Yamaguchi .......... G02B 5/0278 313/116 |
| 8,328,395 | B2* | 12/2012 | Kato ................. G02B 19/0061 362/296.01 |
| 8,714,783 | B2 | 5/2014 | Lee et al. |
| 8,845,119 | B2 | 9/2014 | Iiyama et al. |
| 2003/0156416 | A1 | 8/2003 | Stopa et al. |
| 2007/0002453 | A1 | 1/2007 | Munro |
| 2009/0116245 | A1 | 5/2009 | Yamaguchi |
| 2010/0165640 | A1 | 7/2010 | Lin et al. |
| 2010/0302785 | A1* | 12/2010 | Zhou ................. G02B 19/0071 362/311.02 |
| 2011/0164426 | A1 | 7/2011 | Lee |
| 2011/0182085 | A1 | 7/2011 | Ko et al. |
| 2011/0317432 | A1 | 12/2011 | Lee |
| 2012/0050889 | A1* | 3/2012 | Lu ........................... F21V 5/007 359/718 |
| 2012/0051047 | A1* | 3/2012 | Lu ......................... G02B 3/0056 362/235 |
| 2012/0081614 | A1 | 4/2012 | Yamamoto |
| 2012/0105739 | A1 | 5/2012 | Shimizu |
| 2012/0120343 | A1 | 5/2012 | Yamamoto |
| 2012/0176602 | A1 | 7/2012 | Householder et al. |
| 2012/0268940 | A1 | 10/2012 | Sahlin et al. |
| 2013/0114021 | A1 | 5/2013 | Iiyama et al. |
| 2013/0170208 | A1 | 7/2013 | Kuwaharada et al. |
| 2013/0235590 | A1 | 9/2013 | Van Der Sijde et al. |
| 2014/0009944 | A1 | 1/2014 | Fukuda |
| 2014/0104816 | A1* | 4/2014 | Takasi ....................... F21V 7/24 362/97.3 |
| 2016/0195238 | A1 | 7/2016 | Han et al. |
| 2016/0252233 | A1 | 9/2016 | Han et al. |
| 2017/0059932 | A1 | 3/2017 | Hong et al. |

FOREIGN PATENT DOCUMENTS

| | | |
|---|---|---|
| JP | 2011-198479 | 10/2011 |
| TW | 201033537 | 9/2010 |
| WO | 2011/010488 | 1/2011 |
| WO | 2011/114608 | 9/2011 |

OTHER PUBLICATIONS

Written Opinion dated Mar. 6, 2014, International Application No. PCT/US13/56234.
Non-Final Office Action dated Jan. 15, 2015 in U.S. Appl. No. 13/973,704.
Final Office Action dated Jul. 22, 2015 in U.S. Appl. No. 13/973,704.
Notice of Allowance dated Oct. 2, 2015 in U.S. Appl. No. 13/973,704.
Non-Final Office Action dated Mar. 24, 2017 in U.S. Appl. No. 14/943,685.
Final Office Action dated Aug. 14, 2017 in U.S. Appl. No. 14/943,685.
Non-Final Office Action dated Mar. 15, 2019 in U.S. Appl. No. 15/593,697.
Notice of Allowance dated Aug. 7, 2019 in U.S. Appl. No. 15/593,697.
Notice of Allowance dated Oct. 11, 2017 in U.S. Appl. No. 14/943,685.

* cited by examiner

Pixel 3x3 mm
Illuminance, Lux

Pixel 3x3 mm
Illuminance, Lux

Pixel 3x3 mm
Illuminance, Lux

Pixel 3x3 mm
Illuminance, Lux

Pixel 3x3 mm
Illuminance, Lux

FIG. 17

| Anti-reflective coating |
|---|
| Absorption filter |
| Anti-reflective coating |
| 1st BEF |
| 2nd BEF |
| Diffuser |

THIN DIRECT-VIEW LED BACKLIGHTS

CROSS-REFERENCE TO RELATED APPLICATIONS

This application is a continuation of U.S. patent application Ser. No. 15/593,697, filed on May 12, 2017, which is a continuation-in-part of U.S. patent application Ser. No. 14/943,685, filed on Nov. 17, 2015, now issued as U.S. Pat. No. 9,880,417, which is a continuation of U.S. patent application Ser. No. 13/973,704, filed on Aug. 22, 2013, now issued as U.S. Pat. No. 9,255,695, and claims the benefit of U.S. Provisional Application No. 61/692,024, filed on Aug. 22, 2012, and U.S. Provisional Application No. 62/336,146, filed on May 13, 2016, each of which is hereby incorporated by reference for all purposes as if fully set forth herein.

BACKGROUND

Field

Exemplary embodiments of the present invention relate to a light emitting apparatus, a planar surface light source apparatus, and luminous flux control for a deterministic light deviating member, such as a Total Internal Reflection (TIR) optical lens, and an absorption filter that improves the overall uniformity of a liquid crystal display (LCD) to 90% or more.

Discussion of the Background

In the past decade, flat-screen televisions have gone from mere luxury-status to a market domination status that is so complete that the market for cathode-ray tube (CRT) televisions has been greatly reduced in size. While plasma flat-screens are similar to CRTs in having emissive pixels, the pixels of LCDs are passive, merely acting to rotate the polarization of light passing through them, so that they must be put between two orthogonal polarizers in order for the pixels to act as intensity modulators.

Originally, flat-screen LCDs provided this intensity by utilizing waveguide-based backlights that were edge-illuminated by fluorescent tubes. As light-emitting diodes (LEDs) have increased in brightness and efficacy, they replaced the fluorescent tubes while retaining the edge-illuminated waveguide. However, waveguides may be thick and heavy for large screen sizes, so that direct-view area backlights comprising hollow light boxes may be desirable because their lights are distributed all across the back of the light box. Direct-view area backlights may spread the light out uniformly to eliminate hot spots on the screen just over each LED light source, which is what LEDs without dedicated local lenses may not accomplish.

As LED technology has matured, increasing power output means that fewer LEDs may be needed to do any particular illumination task. When area backlights use fewer LEDs, especially considering the 16:9 proportions of typical high-definition televisions, uniform illumination geometry may become increasingly difficult to achieve.

First, locations intermediate between the LEDs are subject to a cosine to the third-power drop-off, which even at 60° off-axis is an 8:1 ratio. This may be over and above the lesser lateral intensity typical of LEDs. Second, an illumination lens may be subject to inevitable scattering, due to imperfections inherent to the injection-molded lens material, that becomes more important as LED luminosity increases. This may superimpose hot spots upon the direct-light pattern which the lens produces, requiring compensation of that pattern with a central dark zone.

In some applications, these adverse factors may be dealt with by increasing the relative size of the illumination lens compared to that of the LED. LCD backlights, however, may be an inch or less in thickness, severely limiting lens size. Also, this thin geometry increases the strength of light scattering by the lens.

LED backlights are used for myriad applications including LCDs, reach-in refrigeration lighting, and general illumination (light fixtures). All of these applications have a throw distance (panel thickness) much less than the spacing between the LED sources. Since LEDs emit in a quasi-Lambertian manner, a diverging lens is used to spread the emitted light out across a large lateral area. This results in the need for a lens that can modify the forward emitting angular distribution of the LED source into a mostly side-emitting angular distribution. The conventional art has focused almost exclusively on solutions with rotational symmetry. While some of these solutions predict near ideal uniformity in one dimension, they are fundamentally limited by etendue, specifically its skewness, from achieving near ideal uniformity in two dimensions.

In LED backlights, the circuit boards holding the LEDs may be separated by a span greater than the pitch of the LEDs on the board. This may require the illumination lens to produce an asymmetric or rectangular pattern, which adds further difficulties due to the topological incompatibility of the nearly round pattern of the LED versus how light must be horizontally deflected towards the long end of the rectangle.

The array of illumination lenses may superimpose their patterns for intermediate locations, but may create a potential deficit of illumination around the edge of the backlight. The light box may include a specular mirror or 45° beveling around its edges, but for cost reasons this may be impractical. Backlights may employ the 45° beveling around the perimeter, which will dictate how few LEDs can be used and still attain illuminance uniformity.

The conventional art discloses how to construct a surface light source device using a plurality of LEDs as the lighting means for backlighting an LCD monitor for use in personal computers, LCD television sets, tablet displays, as well as for smart phones. U.S. Pat. No. 7,798,679 discloses an example of this architecture. The surface light source device taught therein uses a plurality of LEDs with lenses designed to deviate the light emitted from the LEDs in a deterministic manner; moreover, these lighting elements are situated in a planar array having substantially the same shape as the LCD panel that it is to illuminate. This surface light source device then illuminates the LCD device from the LCD's back surface side.

The '679 patent goes on to disclose that when one deviates the light emitted from the LEDs in the 50°-70° range in order to achieve good uniformity on the LCD screen, one may be confronted by unwanted Fresnel reflections at the base of and interior to the lens outer perimeter. This may lead to secondary bright sources that cause non-uniformity in the LCD backlight display and can be compensated to a certain extent by incorporating a faceted structure to randomly scatter this unwanted light from bottom surface of the lens.

U.S. Pat. No. 8,227,969 considers integrating various types of light scattering bottom surface features and how to construct the faceted bottom surface of flux controlling and light diverting lenses. Convex and concave facets of linear and diagonal geometries are modeled as well as pyramidal scattering facets, including rough etched surfaces on these various facet types. The '969 patent discloses that without an effective diffusing bottom of the lens feature, refractive lenses cannot yield good LCD screen uniformity.

U.S. Pat. No. 8,328,395 discloses the importance of the size and placement of lens leg attachments to a printed circuit board (PCB) along with the facet treatment to defeat strong Fresnel reflections. The '395 patent discloses strategically placing leg attachments to very specific spatial positions and employing those legs as optical conductors to remove some of the unwanted Fresnel reflections, while even including blackening these legs to increase unwanted light absorption, for axial-symmetric lens shapes.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide an axial symmetric TIR lens having an input cavity that reduces unwanted Fresnel reflection effects, and that when combined together with an asymmetrical absorption filter, achieves excellent LCD screen uniformity, in excess of 90%, even for LCD panels with 16:9 screen geometries.

Exemplary embodiments of the present invention also provide a non-axial symmetric lens together with a non-axial symmetric interior cavity to achieve excellent LCD screen uniformity even for panels with 16:9 screen geometries.

Additional features of the invention will be set forth in the description which follows, and in part will be apparent from the description, or may be learned by practice of the invention.

Exemplary embodiments of the present invention disclose TIR illumination lenses. The TIR illumination lenses include an internal cavity surface configured to intercept light emitted by a light source, which may minimize the effect from unwanted Fresnel reflections. According to an exemplary embodiment, the shape of the internal cavity may have a pyramidal-shaped non-rotationally symmetric cross-section. According to another exemplary embodiment, the shape of the internal cavity may have a rotationally symmetric cavity. The illumination lenses according to exemplary embodiments of the present invention also include an absorption filter that improves LCD screen uniformity from 80% or more of the TIR lenses in combination with a diffuser film stack and prismatic brightness enhancing films, to a uniformity of 90% or more.

An exemplary embodiment of the present invention also discloses a light-emitting apparatus including a light-emitting element disposed on a substrate and a light flux control member, such as a TIR lens, disposed on the light-emitting element. The light flux control member includes a bottom surface section disposed on the substrate, a polygonal tilted input surface section including an inward recess disposed in the bottom surface section positioned above the light emitting element, a rotationally symmetric output surface that reflects and/or refracts light passing through the input surface section, and transmits light outside, and at least two leg sections protruding from the bottom surface section of the lens and contacting the substrate.

According to an exemplary embodiment, a light-emitting apparatus includes a light-emitting element and a lens covering the light-emitting element. The lens has an upper surface having a convex shape and a lower surface including a cavity to which light emitted from the light-emitting elements is incident, in which the cavity includes an apex facing an upper surface of the light-emitting element and configured to reduce Fresnel reflection emitted vertically.

The cavity may have a pyramidal shape in a cross-sectional view.

Each side of the cavity may cross a side of the light-emitting element in a plan view.

A height of the cavity may be about 0.5 mm.

A diameter of the lens may be in a range of 12 mm and 16 mm, and a thickness of the lens may be in a range of 3.5 mm and 4.5 mm.

The cavity may have a conical shape in a cross-sectional view.

A hypotenuse of the conical shaped cavity may have a curvature.

The hypotenuse of the conical shaped cavity may have a concave shape.

The upper surface of the lens may include a cusp formed in the center portion of the upper surface, and the apex of the cavity may substantially adjoin the central cusp in a cross-sectional view.

A bottom surface of the cavity may have a polygonal shape, and a side wall of the cavity may form an acute angle with respect to an axis vertical to the bottom surface of the cavity.

The light-emitting apparatus may further include a unit cell including a film stack. The film stack may include a diffuser and at least one brightness enhancement film (BEF) disposed on the diffuser, and an absorption film, in which the light-emitting element may be disposed in a hole formed at the central portion of a bottom floor of the unit cell.

The absorption film may be disposed on a top surface of the film stack.

Opposing surfaces of the absorption film may each include an anti-reflective coating.

A portion of the absorption film overlapping the light-emitting element may have the lowest transmissivity.

A backlight unit may include a plurality of the light-emitting apparatus of the exemplary embodiment disposed in a matrix form, in which the light-emitting apparatus disposed in each row may overlap the light-emitting apparatus disposed in a successive row in a column direction.

A distance between adjacent light-emitting apparatus may be 100 mm.

A backlight unit may include a plurality of the light-emitting apparatus of the exemplary embodiment in a matrix form, in which the light-emitting apparatus disposed in each row may not overlap the light-emitting apparatus disposed in a successive row in a column direction.

According to an exemplary embodiment, a backlight unit includes a plurality of unit cells disposed in a matrix form, each of the unit cells includes a film stack including a diffuser, crossed prismatic brightness enhancing films (BEFs) disposed on the diffuser, and an absorption filter disposed on the BEFs, a light-emitting element disposed in a hole formed in a bottom surface of the unit cell, and a lens covering the light-emitting element and including a conical shaped cavity on a bottom surface of the lens.

A hypotenuse of the conical shaped cavity may have a curvature, and the light-emitting diode may be disposed in the conical shaped cavity.

A diameter of a bottom surface of the conical shaped cavity may be about 2.4 times greater than a longitudinal length of the light-emitting element.

A surface light source apparatus according to an exemplary embodiment includes light emitting elements disposed on a printed circuit board (PCB), and illumination lenses disposed over the light emitting elements, respectively, each of the illumination lenses including an internal surface having an arch shaped non-rotationally symmetric, elongated horizontal cross-section, and configured to intercept light emitted by the light emitting element, and a non-rotational symmetric external surface having a central cusp, in which the PCB has a shape elongated in a first direction, and the horizontal cross-section of the internal surface of the illumination lens is elongated in the first direction.

The internal surface cross-section of the illumination lens may have a length to width ratio at its base of about 2.5:1.

The external surface may be horizontally elongated in the same direction as the elongated horizontal cross-section of the internal surface, and the external surface may have a length to width ratio of 16:15.

The illumination lens may include a transparent material having a refractive index in a range of 1.45 to 1.65.

The illumination lens may further include a bottom surface that interconnects the internal surface and the external surface.

The bottom surface may be configured to absorb Fresnel reflections from the internal surface.

The bottom surface may include a textured portion, a diffusive portion including an array of multi-faceted pyramidal elements, or both of the textured portion and the diffusive portion.

The illumination lens may further include at least two legs protruding from the bottom surface and contacting the PCB.

The surface light source apparatus may further include a light diffusion member disposed on a side surface of the external surface of the illumination lens, and a reflecting diffusive sheet disposed on the PCB, in which the reflective diffusive sheet may include a hole configured to allow light emitted from the illumination lens to escape, and the reflecting diffusive sheet is configured to block Fresnel reflections that occur outside of the illumination lens.

The surface light source apparatus may further include a plurality of PCBs arranged parallel to each other at a first interval, in which the light emitting elements may be arranged on each PCB at a second interval less than the first interval.

The internal surfaces of the illumination lenses may include elongated horizontal cross-sections, respectively, and the horizontal cross-sections of the internal surfaces may be elongated in the first direction.

A display apparatus according to an exemplary embodiment includes a surface light source apparatus, and an illumination target member configured to receive light from the surface light source apparatus, in which the surface light source apparatus includes light emitting elements disposed on a printed circuit board (PCB), and illumination lenses disposed over the light emitting elements, respectively, in which the illumination lens includes an internal surface configured to intercept light emitted by the light emitting element, the internal surface having comprising an arch shaped non-rotationally symmetric, elongated horizontal cross-section, and a non-rotational symmetric external surface comprising a central cusp, the PCB has a shape elongated in a first direction, and the horizontal cross-section of the internal surface is elongated in the first direction.

The internal surface cross-section of the illumination lens may have a length to width ratio at its base of 2.5:1.

The external surface may be horizontally elongated in the same direction as the elongated horizontal cross-section of the internal surface, and the external surface may have a length to width ratio of 16:15.

The illumination lens may further include a bottom surface that interconnects the internal surface and the external surface.

The bottom surface may be configured to absorb Fresnel reflections from the internal surface.

The bottom surface may include a textured portion, a diffusive portion including an array of multi-faceted pyramidal elements, or both of the textured portion and the diffusive portion.

The illumination lens may further include at least two legs protruding from the bottom surface and contacting the PCB.

The display apparatus may further include a light diffusion member disposed on a side surface of the external surface of the illumination lens, and a reflecting diffusive sheet disposed on the PCB, in which the reflective diffusive sheet includes a hole configured to allow light emitted from the illumination lens to escape, and the reflecting diffusive sheet is configured to block Fresnel reflections that occur outside of the illumination lens.

The display apparatus may further include a plurality of PCBs arranged parallel to each other at a first interval, in which the light emitting elements may be arranged on each PCB at a second interval less than the first interval, the internal surfaces of the illumination lenses may include elongated horizontal cross-sections, respectively, and the horizontal cross-sections of the internal surfaces may be elongated in the first direction.

The foregoing general description and the following detailed description are exemplary and explanatory and are intended to provide further explanation of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are included to provide a further understanding of the invention and are incorporated in and constitute a part of this specification, illustrate embodiments of the invention, and together with the description serve to explain the principles of the invention.

FIG. 17 shows a film stack according to an exemplary embodiment.

DETAILED DESCRIPTION

Figure 1A:
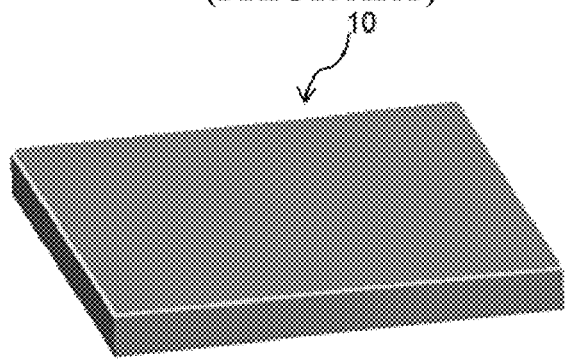
FIG. 1A, FIG. 1B, and FIG. 1C show a conventional backlight unit cell.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

A better understanding of the features and advantages of the present invention will be obtained by reference to the following detailed description of the invention and accompanying drawings, which set forth illustrative embodiments in which the principles of the invention are utilized.

Figure 1B:
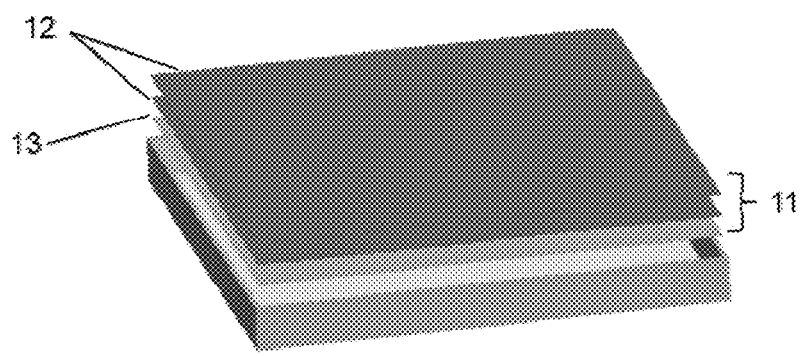
Figure 1C:
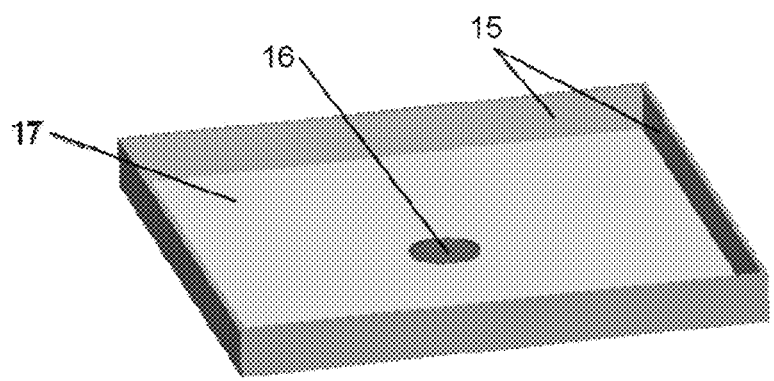
Figure 2A:
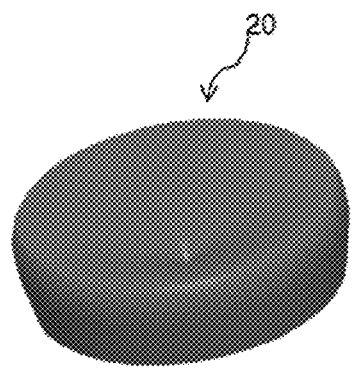
FIG. 2A and FIG. 2B show a TIR lens with a square-shaped cavity.
Figure 2B:
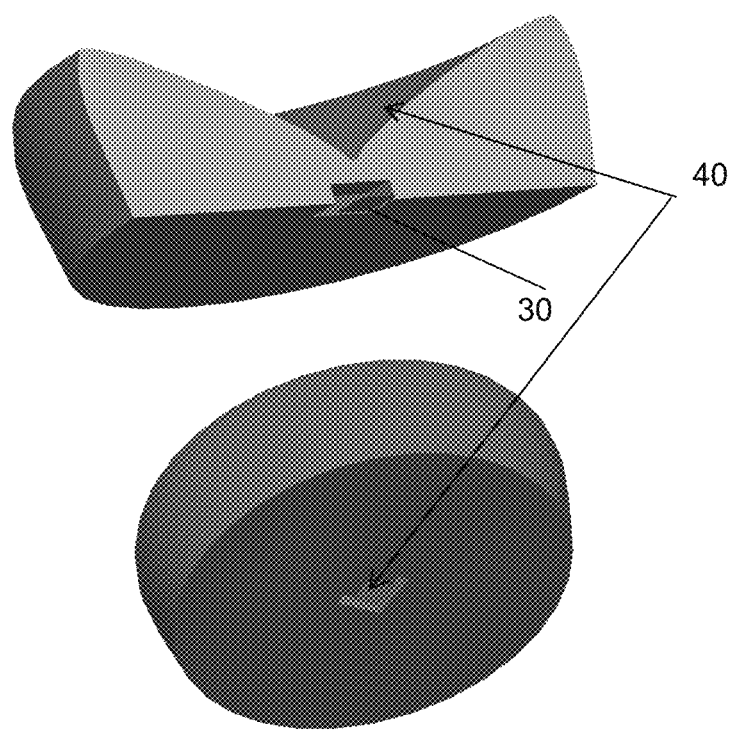
Figure 2C:
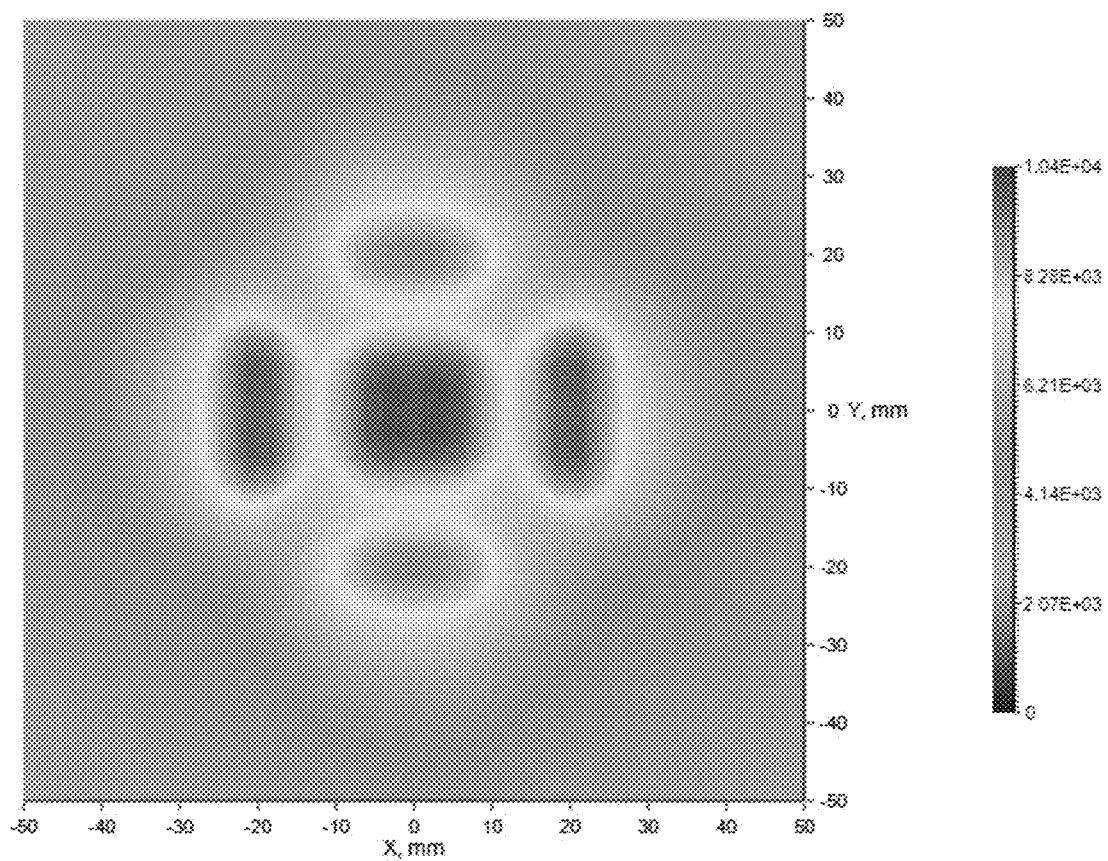
FIG. 2C shows the luminance distribution of the TIR lens of FIG. 2A placed in the backlight unit cell of FIG. 1A.

FIGS. 1A to 1C illustrate a conventional backlight unit cell. FIGS. 2A and 2B illustrate a Total Internal Reflection (TIR) lens with a square-shaped entrance cavity. FIG. 2C shows the luminance distribution of a unit cell including the TIR lens 20 of FIG. 2A placed in the backlight unit cell of FIG. 1A.

Referring to FIG. 1A to 1C, a conventional backlight unit cell 10 may have 100 mm×100 mm dimension and include a single LED (not shown), reflecting walls 15 along the four sides, and a film stack 11. The film stack 11 may include a diffuser 13 and two crossed prismatic brightness enhancing films (BEFs) 12. A reflector 17, for example, a Lambertian reflector such as a large white sheet of diffusively reflecting material, having reflectivity of about 98% may be disposed on a bottom surface of the backlight unit cell 10. A hole 16 (or cavity) may be formed in the middle of the reflector 17, and the depth of the hollow cavity 16 may be about 0.2 mm. An LED (not shown) may be disposed in the hole 16 of the backlight unit cell 10 and connected to a PCB (not shown). The LED may be covered by a TIR lens, which will be described in more detail below.

Referring to FIGS. 2A and 2B, a TIR lens 20 may be disposed on an LED 30. The TIR lens 20 may typically refract or reflect light emitted from the LED 30 into a planar or horizontal direction, thereby redirecting light from the LED 30 in a desired direction as an LED backlight for an LCD screen.

The TIR lens 20 may include transparent resin material, such as polymethylmethacrylate (PMMA), or a transparent glass with or without an anti-reflective coating. As shown in cross-sectional image of FIG. 2B, the LED 30 may be a Lambertian emitter having an emitting area of approximately 1 mm×1 mm with a flux of approximately 120 lumens. The TIR lens 20 may have a inner cavity 40 on the bottom surface thereof and cover the LED 30. The inner cavity 40 of the TIR lens 20 may have a square shape in cross-sectional view, and have circular shape when viewed from the above. Light emitted from the LED 30 is incident to the square cross-sectional shaped inner cavity 40 of the TIR lens 20.

As shown in the luminance distribution of FIG. 2C, a unit cell including the TIR lens 20 of FIG. 2A placed in the backlight unit cell 10 of FIG. 1A may exhibit strong Fresnel reflection around the inner cavity 40 of the 100 mm×100 mm backlight unit cell 10. As used herein, the luminance of the backlight cell 10 is measured in a pixel having a 3×3 mm dimension.

Figure 3A:
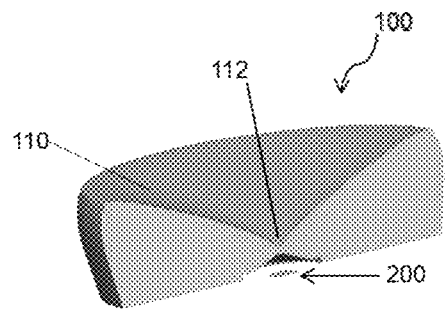
FIG. 3A, FIG. 3B, and FIG. 3C show a TIR lens having a pyramidal shaped cavity according to an exemplary embodiment.
Figure 3B:
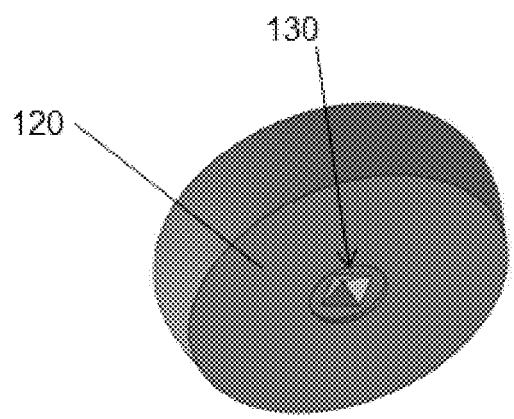
Figure 3C:
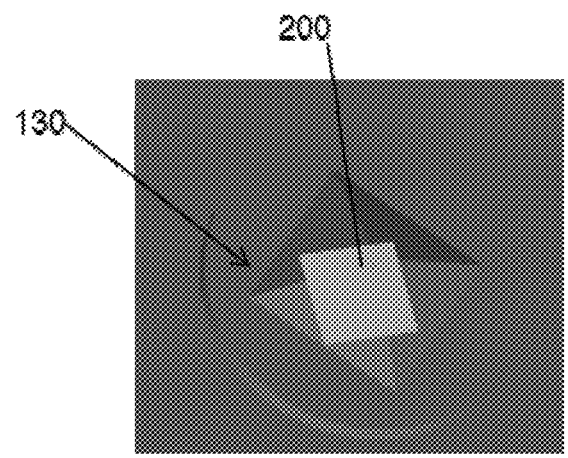
Figure 3D:
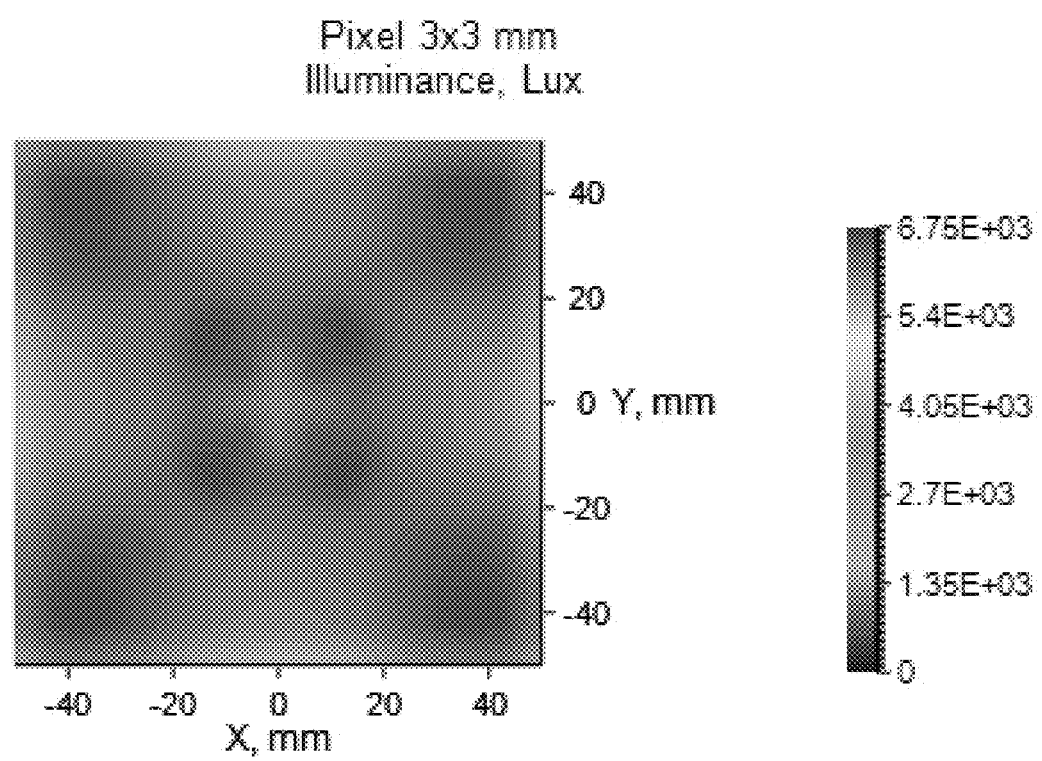
FIG. 3D shows the luminance distribution of a unit cell including the TIR lens of FIG. 3A placed in the backlight unit cell of FIG. 1A.

FIGS. 3A to 3C show a TIR lens having a pyramidal shaped cavity according to an exemplary embodiment. FIG. 3D is a graph showing the luminance distribution of a unit cell including the TIR lens of FIG. 3A placed in the backlight unit cell 10 of FIG. 1A, according to an exemplary embodiment.

Referring to FIGS. 3A to 3C, a unit cell according to an exemplary embodiment includes a TIR lens 100 covering an LED 200. The TIR lens 100 has an external surface 110 formed with a central cusp 112 in the central portion thereof, such that the TIR lens 100 has a convex shape as shown in the cross-sectional image of the TIR lens 100. The TIR lens 100 may refract or reflect light emitted from the LED 200 in a planar or horizontal direction, thereby redirecting light from the LED 200 in a desired direction. According to an exemplary embodiment, the TIR lens 100 may be non-rotationally symmetric or rotationally symmetric. As used herein, the non-rotationally symmetric may refer to a configuration, of which the vertical length (e.g., y-direction) of the external surface 110 being greater than the horizontal length (e.g., x-direction) of the external surface 110.

A bottom surface 120 of the TIR lens 100 may include a cavity 130, which may include an apex that face an upper surface of the LED 200. According to an exemplary embodiment, the cavity 130 may have a pyramidal shape. The pyramidal shaped cavity 130 may be formed into the body of the TIR lens 100 from the bottom surface 120, as illustrated in FIG. 3B. In this manner, light emitted from the LED 200 may be incident to the pyramidal shaped cavity 130 and refracted or reflected at the cavity 130 to increase light uniformity. According to an exemplary embodiment, the TIR lens 100 may have a diameter about 15.5 mm and a thickness about 4.5 mm, without being limited thereto. According to an exemplary embodiment, the shape of the cavity 130 may be varied without being limited to a pyramidal shape. For example, a bottom surface of the cavity 130 may have a polygonal shape, an apex of the cavity 130 may face the upper surface of the LED 200, and a side surface of the cavity 130 connecting an edge of the bottom surface and the apex of the cavity 130 may be inclined. In other words, the side surface of the cavity 130 may form an acute angle with respect to an axis vertical to the upper surface of the LED 200.

Referring to FIG. 3C, according to an exemplary embodiment, the pyramidal shaped cavity 130 is disposed at about 45° with respect to the LED 200 in a plan view. More particularly, a side of the LED 200 may intersect an adjacent side of the pyramidal shaped cavity 130 in a plan view, and an angle formed between the two sides may be about 45°, which may increase light uniformity and optical efficiency. In this manner, multiple reflections from the pyramidal side walls randomize the Fresnel reflections in such a way as to greatly increase uniformity at the surfaces of the crossed BEFs 12 of the film stack 11 shown in FIG. 1B.

FIG. 3D is a graph showing the luminance distribution of a unit cell including the TIR lens of FIG. 3A, measuring 10M rays in a pixel having 3×3 mm dimension. According to an exemplary embodiment, the illuminance uniformity was about 82.3±2.7 (%), brightness after diffuser was 8985 nits at peak, the luminous intensity was 89.8 candela, and the optical efficiency was 52.4%. As used herein, the optical efficiency refers to a flux after a diffuser as compared to a flux from all LEDs. As shown in FIG. 3D, the unit cell including the TIR lens of FIG. 3A according to an exemplary embodiment significantly reduces the Fresnel reflections as compared to that of the backlight unit cell 10 shown in FIG. 2C.

Figure 4:
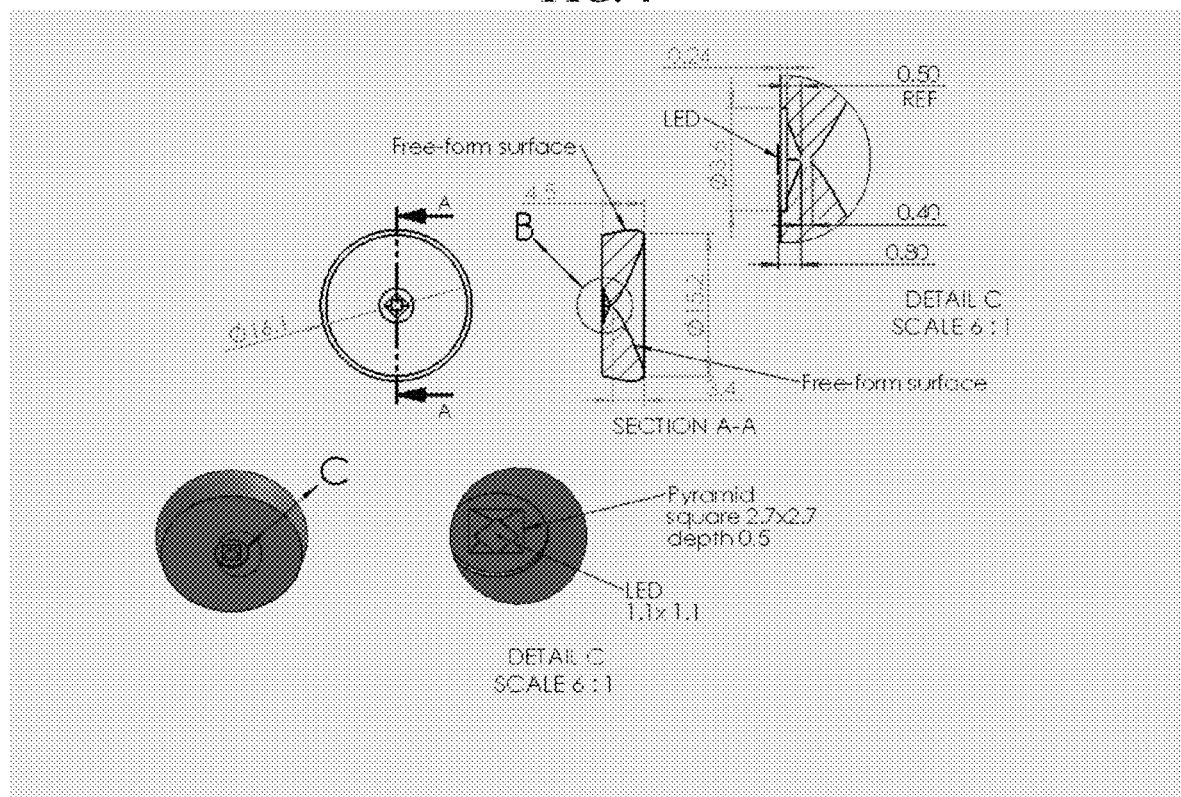
FIG. 4 shows the geometry and dimensions of the pyramidal shaped cavity of the TIR lens of FIG. 3A according to an exemplary embodiment.

FIG. 4 shows the geometry and dimensions of the pyramidal shaped cavity 130 of FIG. 3B according to an exemplary embodiment.

Figure 5:
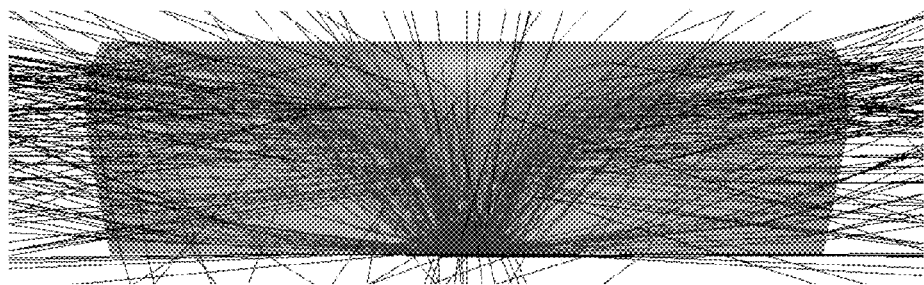
FIG. 5 shows ray tracing of light propagated through the TIR lens of FIG. 3A according to an exemplary embodiment.

FIG. 5 shows ray tracing of light propagated through the TIR lens 100 of FIG. 3A according to an exemplary embodiment. As shown in FIG. 5, light normally directed in a vertical direction is sent substantially in a horizontal direction.

Figure 6A:
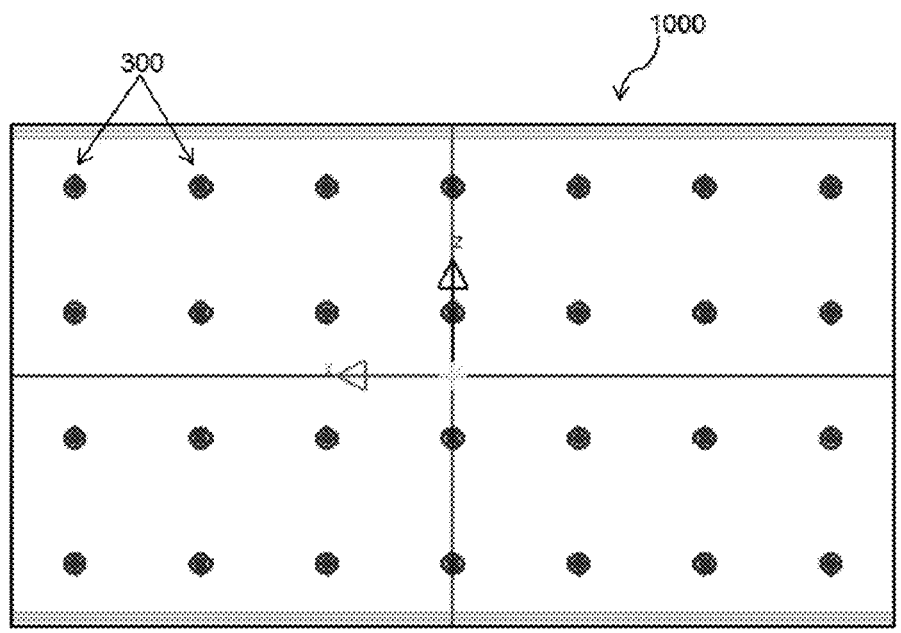
FIG. 6A shows a backlight array including the unit cells of FIG. 3D according to an exemplary embodiment.
Figure 7A:
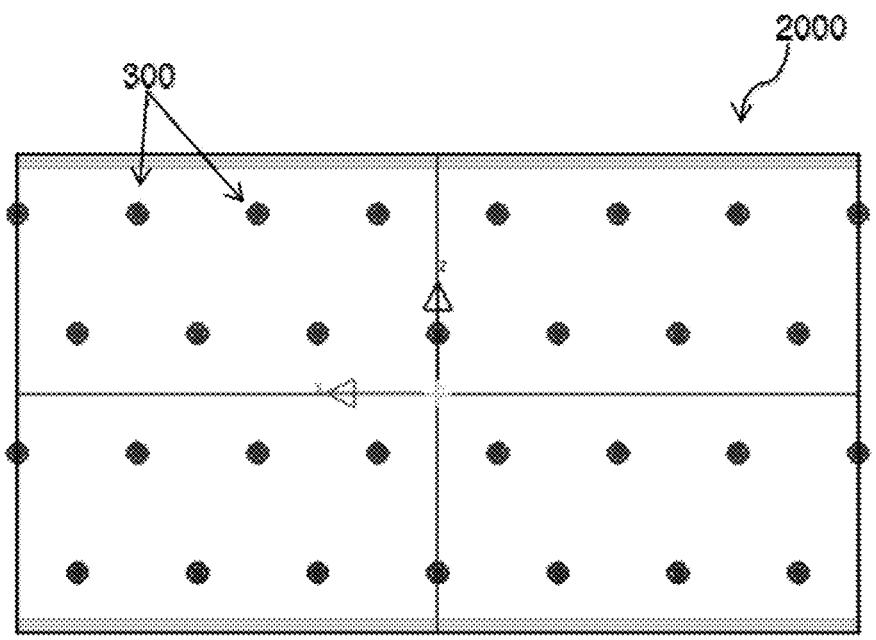
FIG. 7A shows a backlight array including the unit cells of FIG. 3D according to an exemplary embodiment.

FIG. 6A shows a backlight array including the unit cells including the TIR lens of FIG. 3A according to an exemplary embodiment. FIG. 7A shows a backlight array including the unit cells including the TIR lens of FIG. 3A according to an exemplary embodiment.

Referring to FIG. 6A, a backlight array 1000 according to an exemplary embodiment includes multiple unit cells 100. The unit cells 300 of the backlight array 1000 may be substantially the same as the unit cell illustrated in FIG. 1A, and each unit cell 300 may include the TIR lens of FIG. 3A, and thus, repeated description thereof will be omitted. Although the backlight array 1000 of FIG. 6A shows 7 unit cells 300 formed along the horizontal direction (e.g., x-axis) and 4 unit cells formed along the vertical direction (e.g., z-axis), the total number of unit cells in the backlight array 1000 may be varied without the inventive concept being limited thereto.

According to an exemplary embodiment, the backlight array 1000 includes the unit cells 300 in a rectangular pattern as shown in FIG. 6A. FIG. 6A illustrates a portion of 400 mm×700 mm HBLU LED backlight array, in which the unit cell position in successive rows being symmetrical. More particularly, the unit cells 300 in each row may be disposed to overlap the unit cells 300 in adjacent rows in the vertical direction (e.g., z-axis). Further, the unit cells 300 in each column may be disposed to overlap the unit cells 300 in adjacent columns in the horizontal direction (e.g., x-axis). Here, the LEDs in successive rows are directly beneath the LEDs in the previous rows. According to an exemplary embodiment, a distance between adjacent unit cells 300 may be about 100 mm from one another.

Figure 6B:
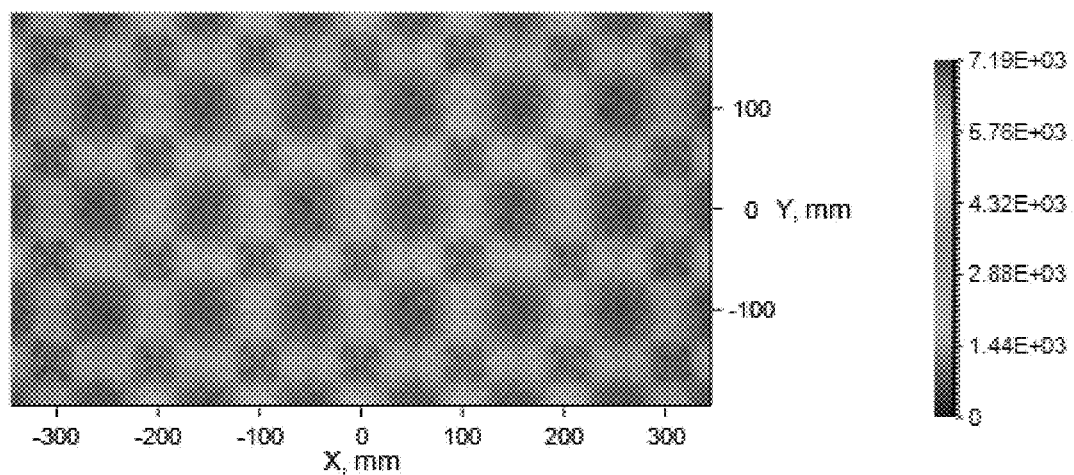
FIG. 6B shows the luminance distribution of the backlight array of FIG. 6A.

FIG. 6B is a graph showing the luminance distribution of the backlight array 1000 of FIG. 6A, measuring 10M rays in a pixel having 3×3 mm dimension. According to an exemplary embodiment, the illuminance uniformity was about 80.7±4.0 (%), brightness after diffuser was 9420 nits at peak, the luminous intensity was 2637 candela, and the optical efficiency was 52.4%.

Referring to FIG. 7A, a backlight array 2000 according to an exemplary embodiment includes multiple unit cells 100. The unit cells 300 of the backlight array 2000 may be substantially the same as the unit cell illustrated in FIG. 1A, and each unit cell 300 may include the TIR lens of FIG. 3A, and thus, repeated descriptions thereof will be omitted. Although the backlight array 2000 of FIG. 7A shows 30 unit cells 300 disposed therein, the total number of unit cells 300 in the backlight array 2000 may be varied without being limited thereto.

According to an exemplary embodiment, the backlight array 2000 includes unit cells 300 in a shifted order as shown in FIG. 7A. More particularly, the unit cells 300 in odd rows may be disposed to overlap the unit cells 300 in adjacent odd rows in the vertical direction (e.g., z-axis). Further, the unit cells 300 in odd columns may be disposed to overlap the unit cells 300 in adjacent odd columns in the horizontal direction (e.g., x-axis). In other words, the unit cells 300 disposed in the odd row may be shifted by a half pitch with regards to successive rows, such that that the unit cells 300 disposed in the odd row may not overlap the unit cells 300 disposed in the even row in the vertical direction (e.g., z-axis). For example, LEDs in successive rows are shifted by 50 mm compared to the LEDs in the row above.

Figure 7B:
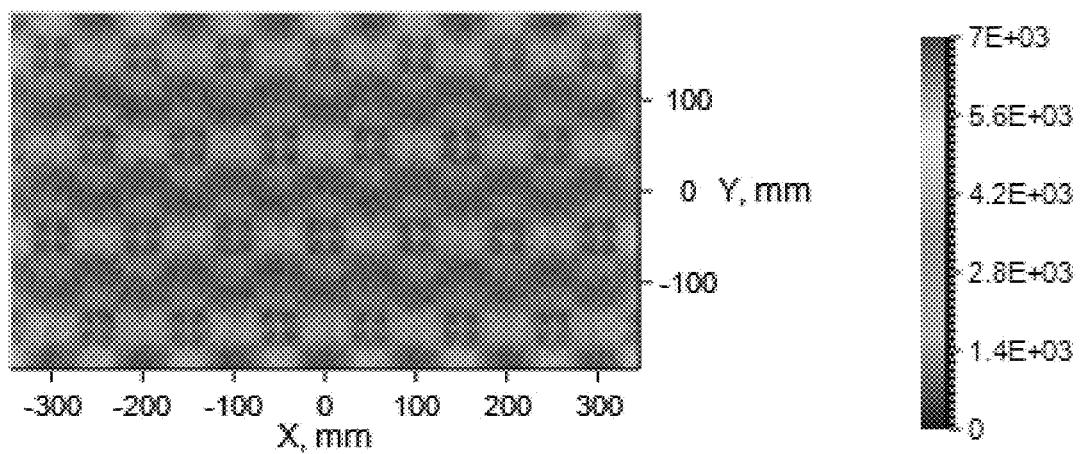
FIG. 7B shows the luminance distribution of the backlight array of FIG. 7A.

FIG. 7B shows a graph showing the luminance distribution of the backlight array 2000 of FIG. 7A, measuring 100M rays in a pixel having 3×3 mm dimension. According to an exemplary embodiment, the illuminance uniformity was about 80±4.0 (%), brightness after diffuser was 9420 nits at peak, the luminous intensity was 2637 candela, and the optical efficiency was 52.4%.

Figure 8A:
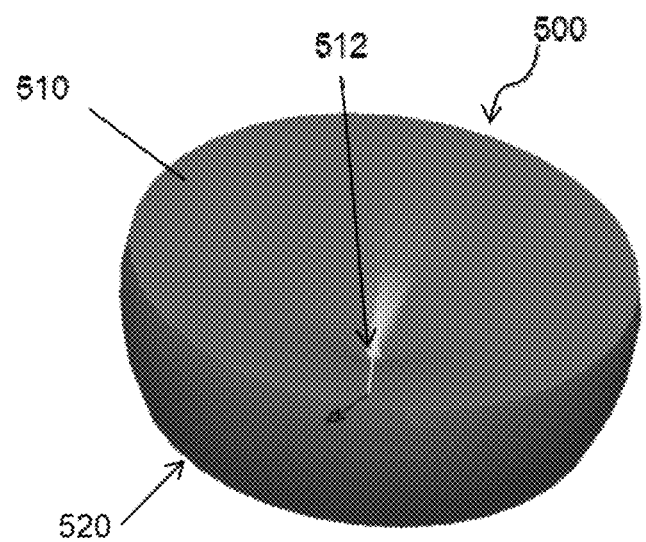
FIG. 8A, FIG. 8B, and FIG. 8C show a TIR lens having a curved conical shaped entry cavity according to an exemplary embodiment.
Figure 8B:
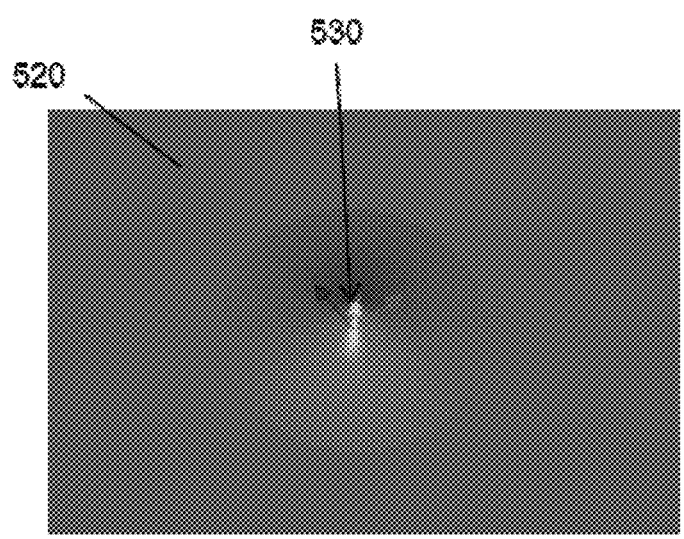
Figure 8C:
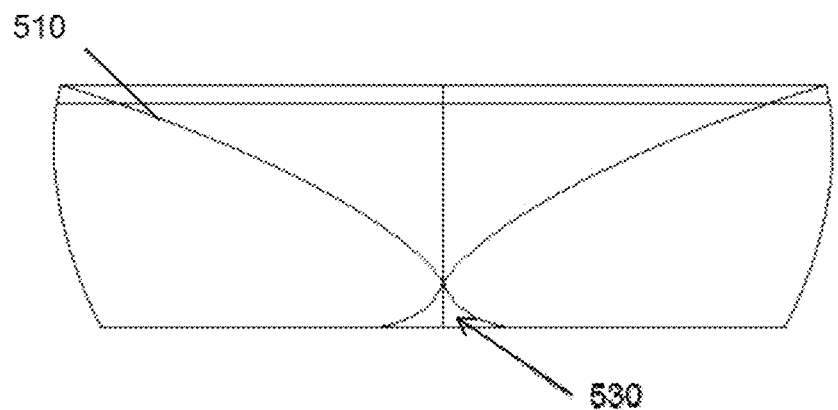
Figure 13A:
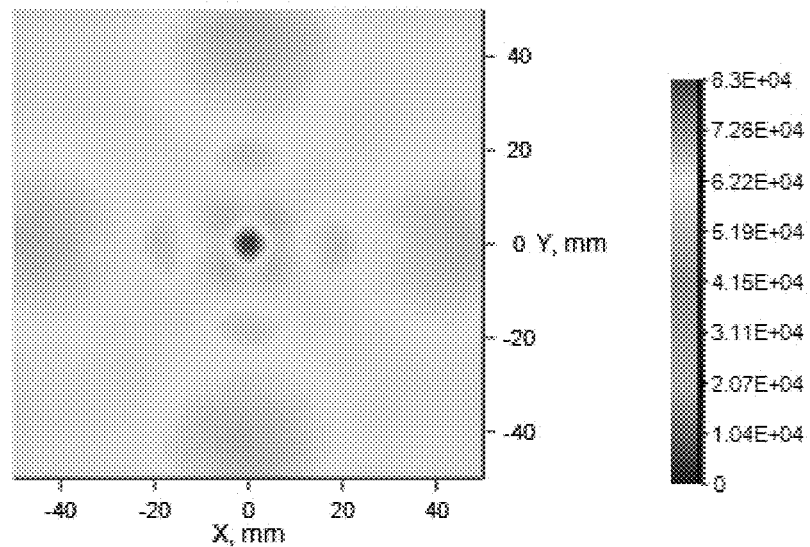
FIG. 13A and FIG. 13B are graphs of data to construct an absorption filter according to an exemplary embodiment.

FIGS. 8A to 8C show a unit cell including a TIR lens having a curved conical shaped cavity according to an exemplary embodiment. FIG. 13D is a graph showing the luminance distribution of a unit cell including the TIR lens of FIG. 13A placed in the backlight unit cell 10 of FIG. 1A according to an exemplary embodiment.

Referring to FIGS. 8A to 8C, a unit cell according to an exemplary embodiment includes a TIR lens 500 disposed on an LED (not shown). The TIR lens 500 has an external surface 510 formed with a central cusp 512 in the central portion thereof, such that the TIR lens 500 has a convex shape as shown in the cross-sectional image of the TIR lens 500. The TIR lens 500 may refract or reflect light emitted from an LED (not shown) in a planar or horizontal direction, thereby redirecting light from the LED in a desired direction. According to an exemplary embodiment, the external surface 510 of the TIR lens 500 may be non-rotationally symmetric or rotationally symmetric.

A bottom surface 520 of the TIR lens 500 may include a cavity 530, which has an apex facing an upper surface of the LED (not shown). According to an exemplary embodiment, the cavity 530 may have a curved conical shape. The curved conical shaped cavity 530 may be formed into the body of the TIR lens 500 from the bottom surface 520, as illustrated in FIG. 8C. In particular, a hypotenuse of the curved conical shaped cavity 530 may have a concave shape, as shown in the cross-sectional image of the TIR lens 500. In this manner, light emitted from an LED may be incident to the curved conical shaped cavity 530 and refracted or reflected therefrom, which increases light uniformity. In addition, the apex of the curved conical shaped cavity 530 may substantially adjoin the central cusp 512 of the TIR lens 500. According to an exemplary embodiment, the TIR lens 500 may have a diameter about 12 mm and a thickness about 3.5 mm, without being limited thereto.

Figure 8D:
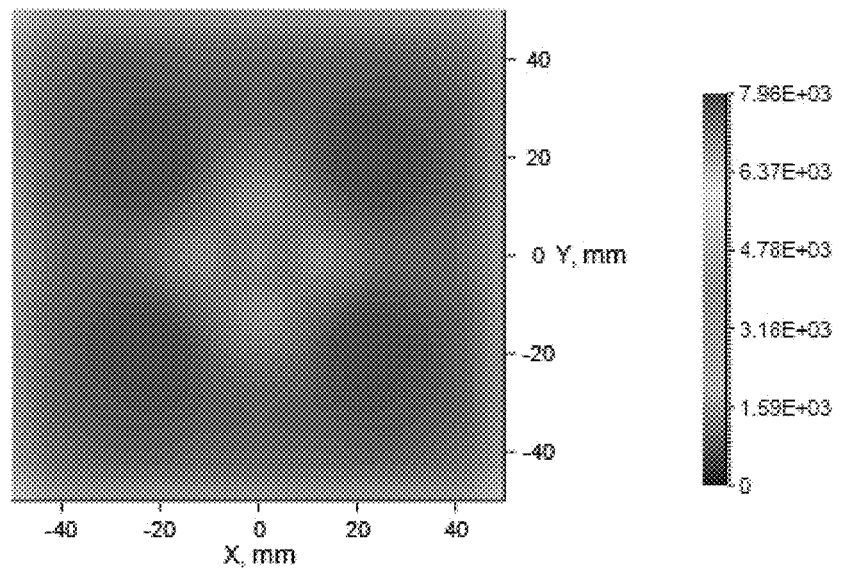
FIG. 8D shows the luminance distribution of a unit cell including the TIR lens of FIG. 8C placed in the backlight unit cell of FIG. 1A.

FIG. 8D is a graph showing the luminance distribution of a unit cell including a TIR lens of FIG. 8A placed in the backlight unit cell 10 of FIG. 1A, measuring 10M rays in a pixel having 3×3 mm dimension. According to an exemplary embodiment, the illuminance uniformity was about 86.2±2.3 (%), brightness after diffuser was 10940 nits at peak, the luminous intensity was 109.4 candela, and the optical efficiency was 62.2%. As used herein, the optical efficiency refers to flux after diffuser compared to flux from all LEDs. As shown in FIG. 8D, the unit cell including the TIR lens 500 according to an exemplary embodiment significantly reduces the Fresnel reflections as compared to that in the back light unit cell 10 shown in FIG. 2C.

Figure 9:
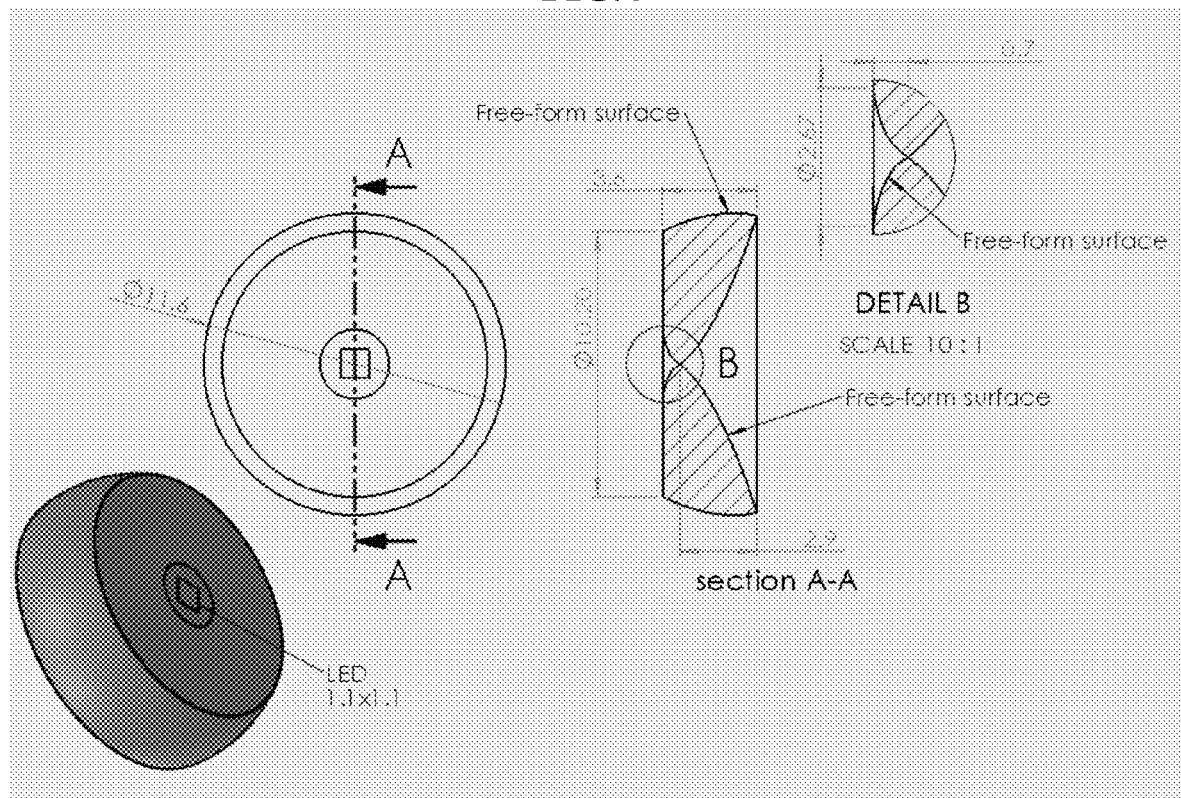
FIG. 9 shows the geometry and dimensions of the curved conical shaped cavity of FIG. 8C according to an exemplary embodiment.

FIG. 9 shows the geometry and dimensions of the curved conical shaped cavity 130 of FIG. 8C according to an exemplary embodiment. For example, the diameter of a bottom surface of the curved conical shaped cavity may be about 2.67 mm, and a horizontal length of the LED may be about 1.1 mm, without being limited thereto.

Figure 10:
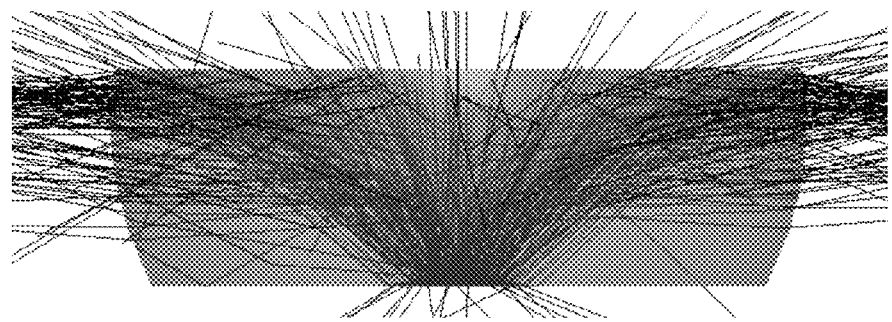
FIG. 10 shows ray tracing of light propagated through the TIR lens of FIG. 8C.

FIG. 10 shows ray tracing of light propagated through the TIR lens of FIG. 8C according to an exemplary embodiment.

Figure 11A:
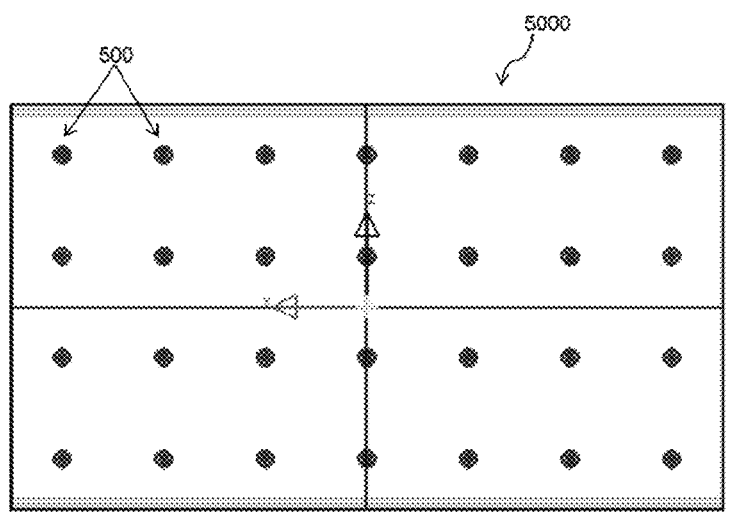
FIG. 11A shows a backlight array including the unit cells of FIG. 8D according to an exemplary embodiment.
Figure 12A:
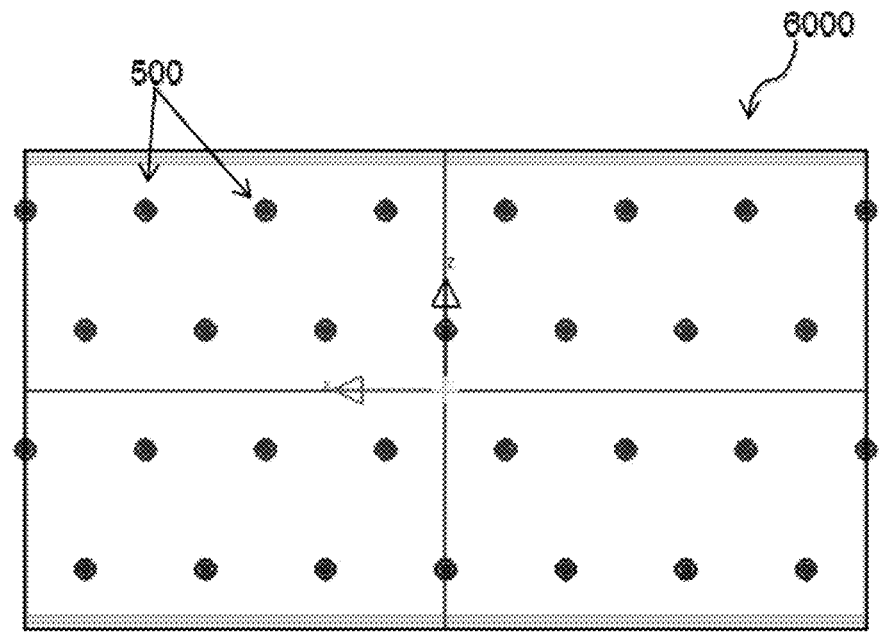
FIG. 12A shows a backlight array including the unit cells of FIG. 8D according to an exemplary embodiment.

FIG. 11A shows a backlight array including the unit cells having the TIR lens of FIG. 8C according to an exemplary embodiment. FIG. 12A shows a backlight array including the unit cells including the TIR lens of FIG. 8C according to an exemplary embodiment.

Referring to FIG. 11A, a backlight array 5000 according to an exemplary embodiment includes multiple unit cells 500. The unit cells 500 of the backlight array 5000 may be substantially the same as the unit cell illustrated in FIG. 1A, and each unit cell 500 may include the TIR lens of FIG. 8C, and thus, repeated description thereof will be omitted. Although the backlight array 5000 of FIG. 11A shows 7 unit cells 500 formed along the horizontal direction (e.g., x-axis) and 4 unit cells 500 formed along the vertical direction (e.g., z-axis), the total number of unit cells 500 in the backlight array 5000 may be varied without the inventive concept being limited thereto.

According to an exemplary embodiment, the backlight array 5000 includes unit cells 500 in a rectangular pattern as shown in FIG. 11A. FIG. 11A illustrates a portion of 400 mm×700 mm HBLU LED backlight array, in which the unit cell position in successive rows being symmetrical. More particularly, the unit cells 500 in each row may be disposed to overlap the unit cells 500 in adjacent rows in the vertical direction (e.g., z-axis). Further, the unit cells 500 in each column may be disposed to overlap the unit cells 500 in adjacent columns in the horizontal direction (e.g., x-axis).

Figure 11B:
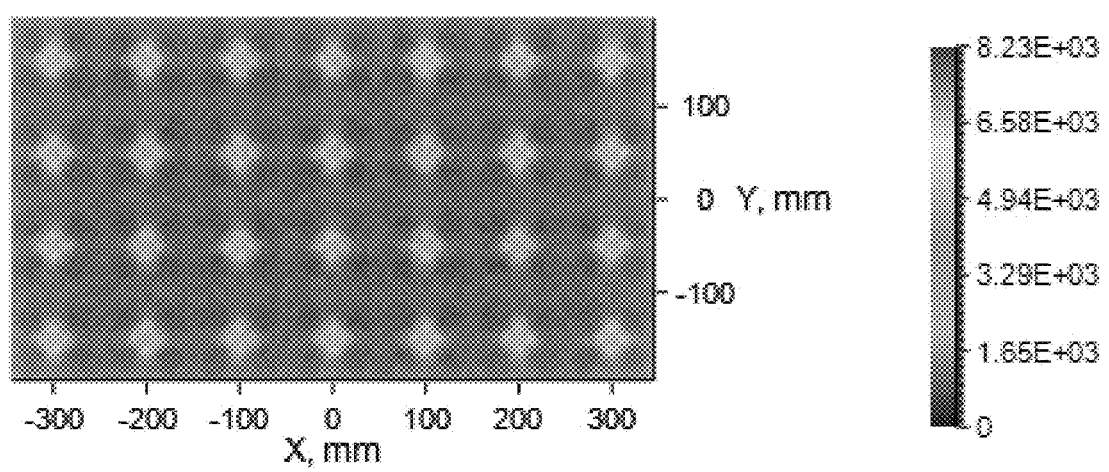
FIG. 11B shows the luminance distribution of the backlight array of FIG. 11A.

FIG. 11B shows a graph illustrating the luminance distribution of the backlight array 5000 of FIG. 11A, measuring 10M rays in a pixel having 3×3 mm dimension. According to an exemplary embodiment, the illuminance uniformity was about 78.7±3.5 (%), brightness after diffuser was 7603 nits at peak, the luminous intensity was 2129 candela, and the optical efficiency was 63.4%.

Referring to FIG. 12A, a backlight array 6000 according to an exemplary embodiment includes multiple unit cells 500. The unit cells 500 of the backlight array 6000 may be substantially the same as the unit cell illustrated in FIG. 1A, and each unit cell 500 may include the TIR lens of FIG. 8C, and thus, repeated description thereof will be omitted. Although the backlight array 6000 of FIG. 17A shows 30 unit cells 500 disposed therein, the total number of unit cells 500 in the backlight array 6000 may be varied without being limited thereto.

According to an exemplary embodiment, the backlight array 6000 includes unit cells 500 in a shifted order as shown in FIG. 12A. More particularly, the unit cells 500 in odd rows may be disposed to overlap unit cells 500 in adjacent odd rows in the vertical axis (e.g., z-axis). Further, the unit cells 500 in odd columns may be disposed to overlap the unit cells 500 in adjacent odd columns in the horizontal direction (e.g., x-axis). The unit cells 500 disposed in the odd row may be shifted by a half pitch, such that that the unit cells 500 disposed in the odd row may not overlap the unit cells 500 disposed in the even row in the vertical direction (e.g., z-axis).

Figure 12B:
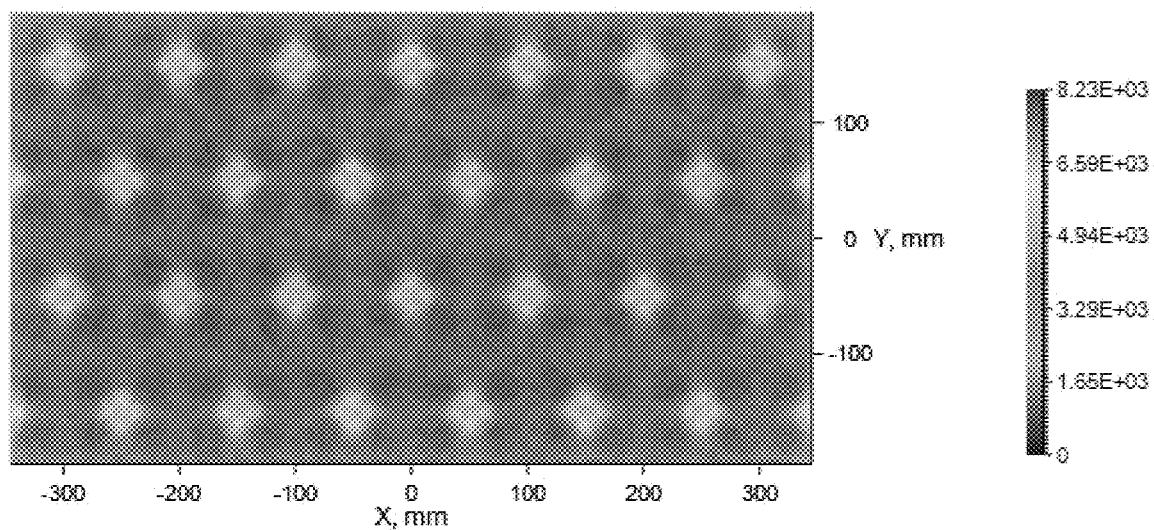
FIG. 12B shows the luminance distribution of the backlight array of FIG. 12A.

FIG. 12B shows the luminance distribution of the backlight array 6000 of FIG. 12A, measuring 100M rays in a pixel having 3×3 mm dimension. According to an exemplary embodiment, the illuminance uniformity was about 76.3±3.5 (%), brightness after diffuser was 10985 nits at peak, the luminous intensity was 3076 candela, and the optical efficiency was 61.4%.

According to an exemplary embodiment, a unit cell including a TIR lens illustrated above with reference to FIGS. 3A and 8A may further include a spatial absorption filter, which may further improve light uniformity.

Figure 13B:
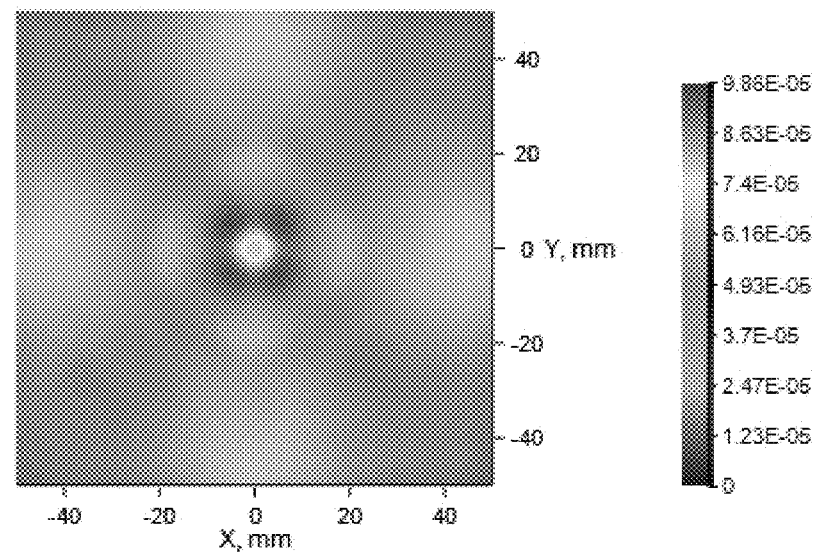
Figure 13C:
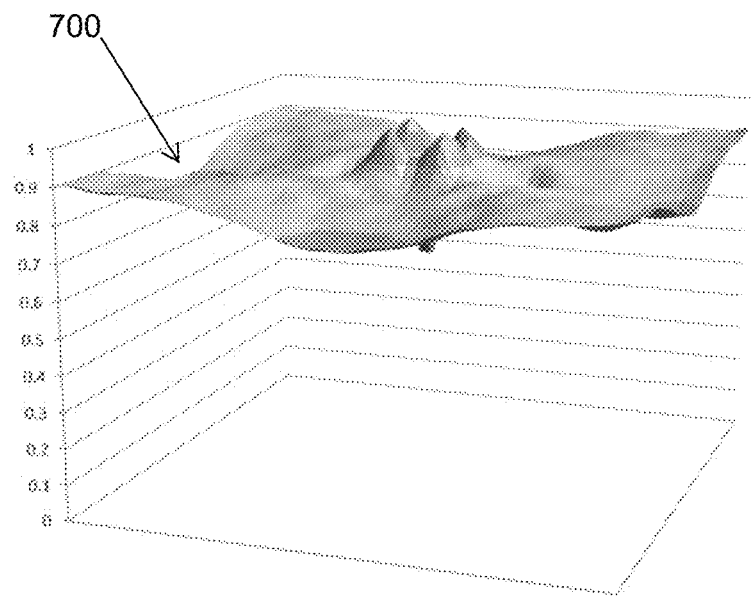
FIG. 13C shows an absorption filter according to an exemplary embodiment.

FIG. 13A and FIG. 13B are graphs of data used to construct an absorption filter according to an exemplary embodiment. FIG. 13C is a graph illustrating an absorption filter according to an exemplary embodiment.

More particularly, FIG. 13A shows an illumination distribution of a unit cell including a TIR lens according to an exemplary embodiment. Referring back to FIG. 1B, the unit cell includes a film stack 11, which may include a diffuser 13 and two crossed prismatic brightness enhancing films (BEF) 12. As shown in FIG. 13A, the illumination distribution taken from the top of the unit cell including the film stack 11 exhibits the strongest brightness around the center portion of the unit cell where an LED is disposed.

FIG. 13B shows transmission function that is associated with the illuminance distribution of FIG. 13A, such that a mere uniform illuminance is obtained as shown FIG. 13C below. The absorption filter 700 shown in FIG. 13C may absorb light, and may increase the brightness uniformity as shown in FIG. 14 described below.

Figure 14:
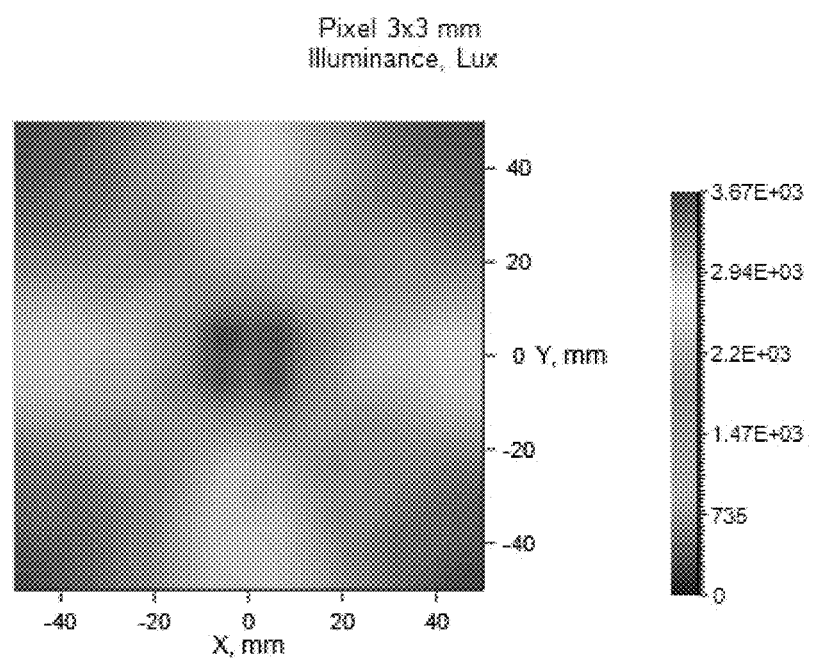
FIG. 14 shows the effect of placing the absorption filter of FIG. 13C between a diffuser and BEFs in a unit cell, according to an exemplary embodiment.

FIG. 14 shows the illumination distribution of a unit cell including a TIR lens according to exemplary embodiments, when the absorption filter is placed above the diffuser and below the two crossed prismatic BEFs.

More particularly, referring back to FIG. 1B, the film stack 11 includes a diffuser 13 and two crossed prismatic BEFs 12 disposed on the diffuser 13. In the unit cell of FIG. 14, the absorption filter according to an exemplary embodiment is disposed between the diffuser 13 and the two BEFs 12. The unit cell shown in FIG. 14 was measured with 10M rays in a pixel having 3×3 mm dimension, and the illuminance uniformity was about 77.6±3.6 (%), brightness after diffuser was 4650 nits at peak, and the luminous intensity was 46.5, and the optical efficiency was 26.7%. As can be seen, the illuminance uniformity and the optical efficiency dropped when the absorption filter was disposed between the diffuser 13 and the two BEFs 12, since the absorption filter changes the distribution of light reflected from BEFs towards the cavity of a unit cell.

Figure 15A:
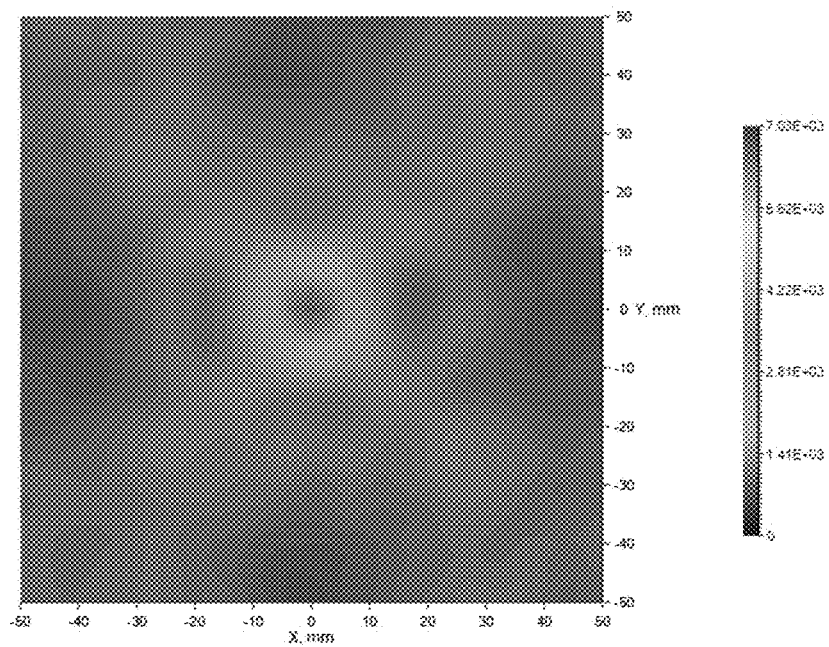
FIG. 15A shows the illuminance distribution above the film stack, and FIG. 15 B shows the transmission function of a corresponding absorption film to be placed above the film stack according to an exemplary embodiment.
Figure 15B:
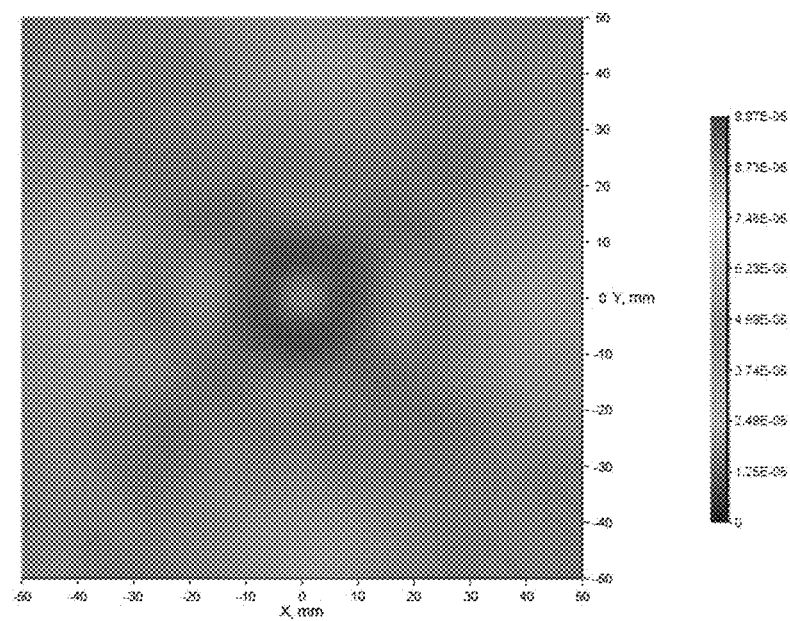

FIG. 15A shows the illumination distribution above the BEFs, and FIG. 15B shows the transmission function of the corresponding absorption film to be placed above the BEFs, according to an exemplary embodiment.

In the unit cell of FIGS. 15A and 15B, the absorption filter according to an exemplary embodiment is disposed on top of the two BEFs 12, which are disposed on the diffuser 13. In this manner, the absorption filter may not change light propagation inside the hollow cavity 16 (see FIG. 1C), and suppresses light within local hot spots above the film stack 11. Furthermore, both surfaces of the absorption filter may be coated with an anti-reflective material, as shown in FIG. 17, which may reduce the impact of reflected light on the luminance uniformity of the unit cell.

Figure 16:
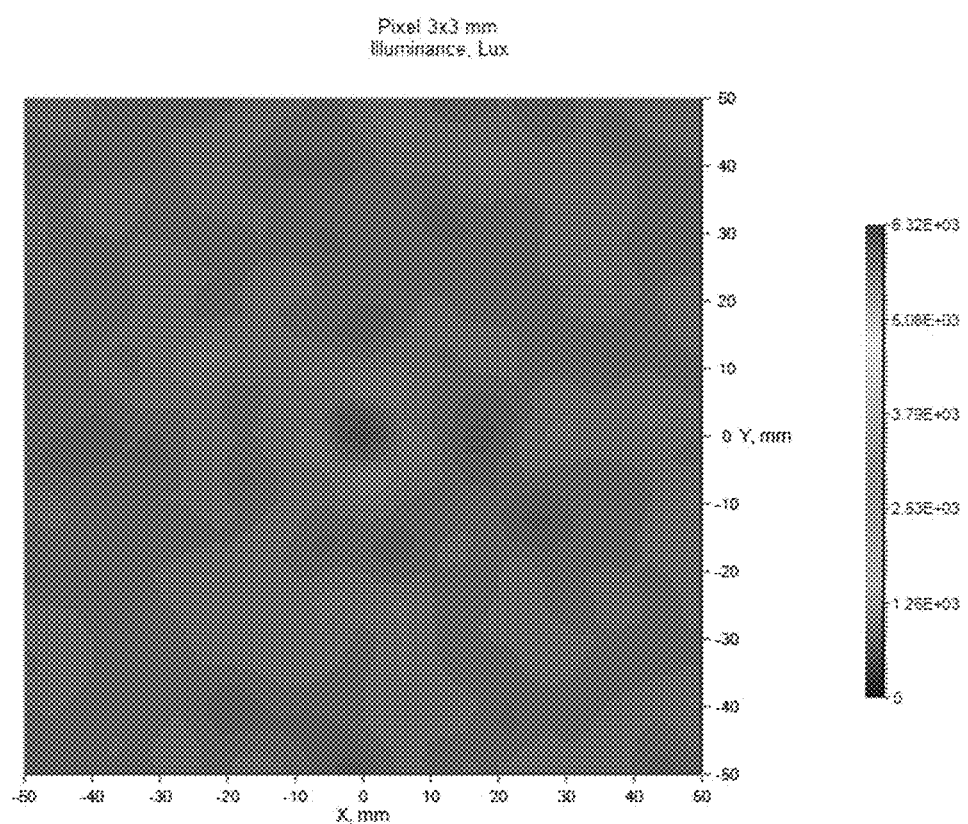
FIG. 16 shows the illuminance distribution a unit cell including the absorption filter of FIG. 13C according to an exemplary embodiment.

The unit cell shown in FIGS. 15A and 15B was measured with 10M rays in a pixel having 3×3 mm dimension, and the illuminance uniformity of FIG. 16 was about 92.9±3.0 (%), brightness after diffuser was 8710 nits at peak, and the luminous intensity was 87.1 candela, and the optical efficiency was 50%, as shown in FIG. 16. As shown in FIG. 16, forming the absorption filter on a top surface of the film stack 11 in a unit cell including a TIR lens with pyramidal or curved conical shaped cavities according to exemplary embodiments, achieved illuminance uniformity over 90% with an optical efficiency of 50%.

Illumination lenses for LED direct-view backlights can be categorized as short-throw illuminators, which use a lens that has minimal intensity on-axis and its greatest intensity at high lateral angles. A short-throw lens must accordingly have minimum central thickness, having an interior surface with an arch-like shape that surrounds the LED and an exterior surface that extends outward to generate the lateral lens thickness that maximizes lateral intensity. The lenses presented in the conventional art are rotationally symmetric, with a profile being swept about a central axis to generate the solid. These lenses typically have negative optical power at their center with either a concave-plano, concave-concave, or plano-concave lens shapes. In order to achieve greater uniformity and to introduce additional degrees of freedom, the lens according to exemplary embodiments of the present invention breaks rotational symmetry. Specifically, the lens profiles in the ordinal and diagonal directions are independent. The result, in the application of backlights, is a somewhat "square" lens that directs a portion of light from the ordinal directions to the diagonals.

A rectangular lens pattern may be produced using a free-form lens that is not circularly symmetric, so that it can throw more light towards the long end of the rectangle and less towards its short end. In exemplary embodiments of the present invention the interior surface is more out of round than the exterior surface, and the exterior surface has a central cusp to produce a negative lens and to reduce the on-axis output and compensate for the stray-light hot-spot just above the lens. Exemplary embodiments of the present invention relate to a 2:1 rectangle, for 200 mm PCB board separation and 100 mm on-board separation of the lenses (i.e. LEDs) arrayed inside a light box with only an inch in thickness, with the inside top diffuser being only 23 mm above the LED.

A light emitting device according to an exemplary embodiment of the present invention is described below with reference to FIGS. 18A through 18E.

Figure 18A:
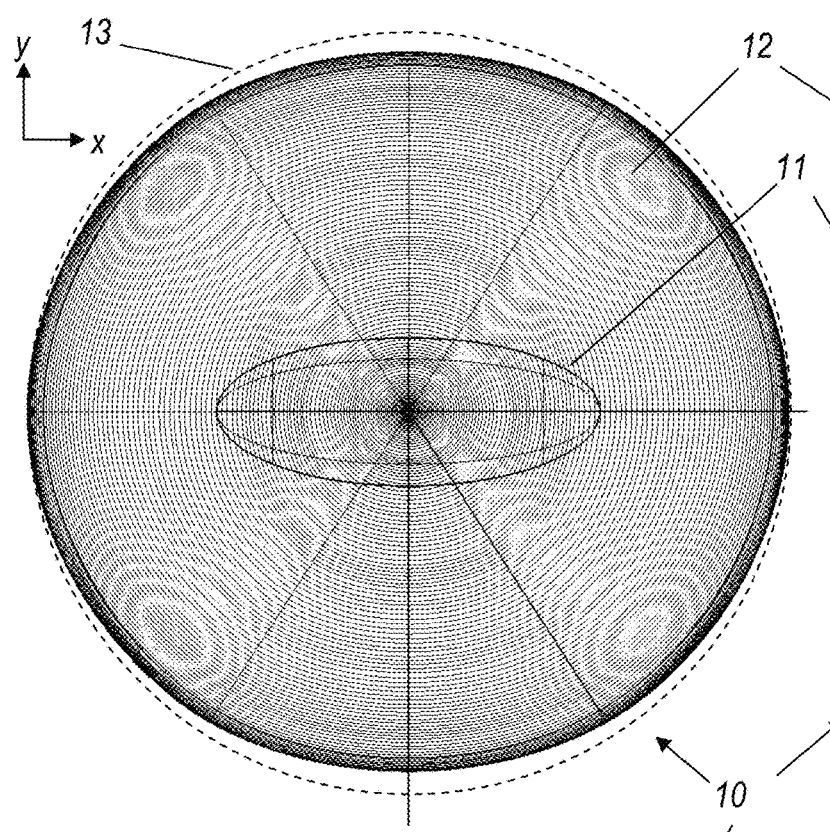
FIG. 18A is a top view of an exemplary embodiment of the present invention showing a non-axial symmetric shape of a light emission outer surface.

FIG. 18A is a top view of a light flux controlling member, or more simply termed, illumination lens 10, comprising a horizontally (i.e., x-axis) elongated inner cavity with a vertically arched internal surface 11, and external convex surface 12, which is much larger. Dotted circle 13 has a diameter of 18 mm and shows how surface 12 is a non-rotationally symmetric outer surface. The inner surface 11 may have a length to width ratio at the base thereof of about 2.5:1. The external surface 12 may be horizontally elongated in the same direction as the elongated cross-section of the inner surface 11 and have a length to width ratio of about 16:15.

The light emitting device according to the present exemplary embodiment illustrated in FIG. 18A includes a light emitting element, typically an LED located at the intersection of the X-Y axis (not shown in FIG. 18A) and a light illumination lens 10 arranged to surround and cover the LED. A direction of light axis Z (a reference light axis) is not shown but assumed to be along the Z axis of the right-handed coordinate system XYZ and assumed to be coming vertically out of the center of FIG. 18A and perpendicular to the page as shown in FIG. 18D.

Furthermore, the illumination lens 10 has a non-rotationally symmetric shape with respect to the light axis Z and moreover, the central inner cavity which receives radiation from the LED is highly asymmetric. The illumination lens 10 refracts the light emitted from the LED in a direction more parallel to a direction perpendicular to the light axis Z so as to redirect the light coming from the LED in a more useful direction as an LED backlight for an LCD screen.

The illumination lens 10 is a member for changing the direction of light emitted from the LED. However, the light flux controlling member 10 may be made from a transparent material having a refractive index in the range of 1.45 to 1.65. In addition, it the illumination lens 10 may be made from a transparent resin material or a transparent glass. Examples of such transparent resin material are polymethylmethacrylate (acrylic or PMMA) having a refractive index of 1.49, polycarbonate (PC) having a refractive index of 1.59, a proxy resin (EP), and the like.

Figure 18B:
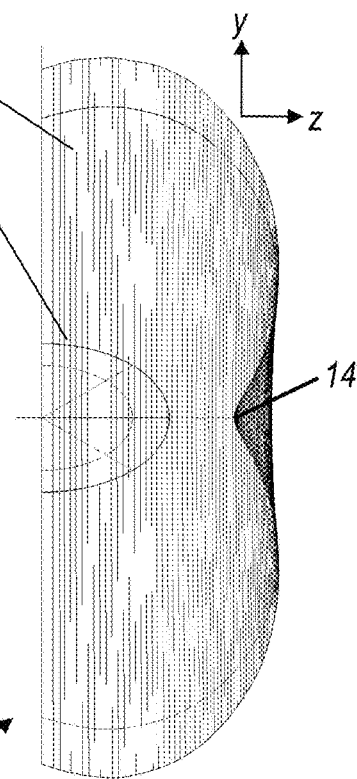
FIG. 18B is a side view of the exemplary embodiment in the x-direction and showing a cross-sectional view of an inner cavity when viewed from the x-direction.
Figure 18C:
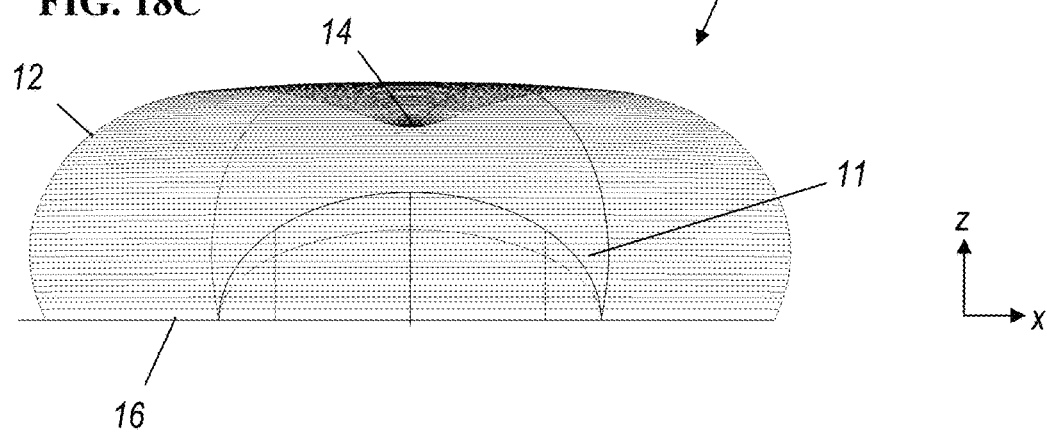
FIG. 18C is a side view of the exemplary embodiment in the y-direction and showing the non-axial symmetry of the inner cavity.
Figure 18D:
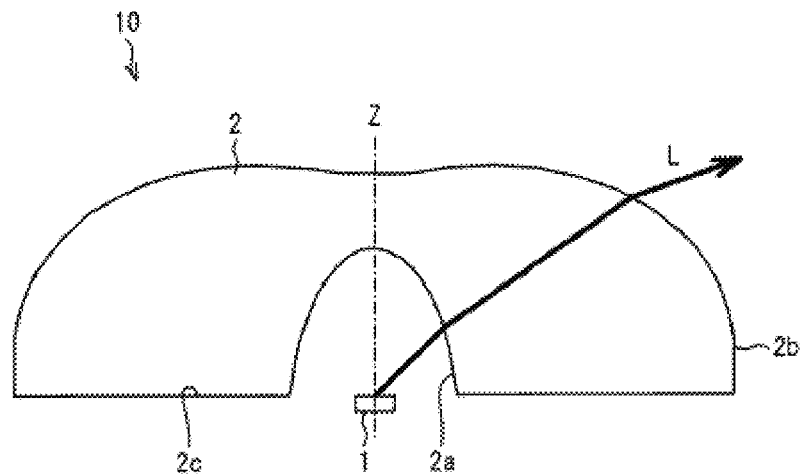
FIG. 18D is a cross-sectional view of FIG. 1A looking along the +x direction and showing the refraction at the entrance surface and exit surface that a light ray emitted from an LED in the exemplary embodiment undergoes.

Now turning our attention to FIGS. 18B and 18C, we see that the illumination lens 10 has a light incoming surface 11 as an internal surface, a light outgoing surface 12 as an external surface, a central cusp 14, and a bottom surface 16 that interconnects the light incoming surface 11 with a light outgoing surface 12 and central cusp 14. The illumination lens 10 has an empty highly-asymmetric cavity space therein and the LED is disposed in the empty cavity space. The LED is a member that emits light into its surroundings with the light axis Z as the center of its light emission. The LED is not particularly limited, and a conventional LED chip may be used as a light-emitting element.

FIG. 18B is a cross sectional view taken along the −y and +y axis of lens 10, also showing internal surface 11 and external surface 12 with central cusp 14.

FIG. 18C is a cross sectional view taken along the −x and +x axis, looking in the +y-direction, of illumination lens 10, also showing the highly asymmetric internal surface 11 and external surface 12 with central cusp 14 as compared to FIG. 18B. FIGS. 18B and 18C illustrate cross-sectional views of the light emitting device in accordance with the present exemplary embodiment. According to the present exemplary embodiment, a light direction is changed on both the internal surface 11, external surface 12, and central cusp 14, so it is possible to form external surface 12 in a convex shape (i.e., the central cusp 14) in the vicinity of light axis Z. The central cusp 14 may disposed at a height about 5/6 of the maximum height of the external surface 12, for instance. The internal surface 11 may have a central apex height that is about 55% of a maximum height of the illumination lens 10.

FIG. 18D is a view of illumination lens 10, looking along the +x axis. Here LED 1 emits a photon that is refracted at surface 2a and then travels through the lens 10 until it refracts again at surface 2b. Bottom surface 2c connects the inner cavity 2a with the outer surface 2b.

Figure 18E:
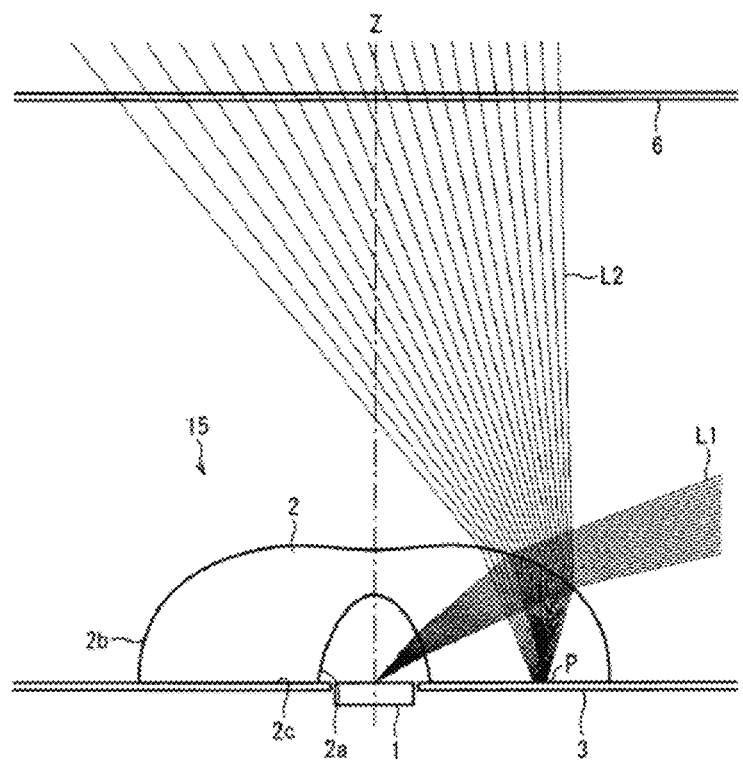
FIG. 18E is the same view as in FIG. 1D but shows the Fresnel reflections that occur internal to the lens when the beam of light rays leaving the LED exceeds about 50°.

FIG. 18E is a view of illumination lens 15, showing a beam of photons leaving the LED 1 inclined at an angle of about 50°+, and shows the strong Fresnel reflection which is sent to the bottom of surface 2c where it reflects at point P and passes back through the illumination lens 15 and emerges from top surface 2 and strikes top diffuser 6, causing a secondary source of light which may make forming a uniform distribution of light on the diffuser 6 difficult. To counter this effect FIG. 18E shows a surface 3 which may be a roughened surface and/or a multi-faceted pyramidal diffuser that randomizes the light reflected from point P, for instance. Surface 3 and surface 2c may also be the same surface, and this diffusing structure may be included in injection mold tooling for forming the lens 15.

Figure 19:
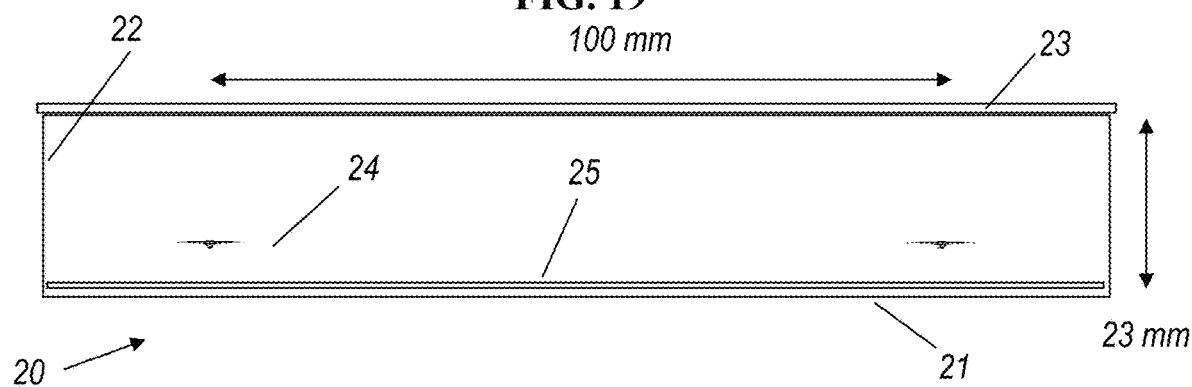
FIG. 19 is a side view of two lenses from a portion of a light box according to an exemplary embodiment of the present invention.

FIG. 19 is a side view of light box 20, a subsection including bottom surface 21 and lateral walls 22 coated with a highly reflective diffuse white material with diffuse reflectivity in excess of 95% and at the extreme ends of the light box lateral walls 22 will be inclined at a 45° bevel. The top surface film stack 23 is horizontally disposed, and may include a lower diffuser sheet, a prism sheet with horizontally (x-axis) aligned prisms, and a top most polarization reflecting layer. The film stack diffusely reflects more than half the upward going light, back down to the white bottom surface 21, which in turn reflects it back upwards, improving the overall uniformity of the light going up out of the film stack 23. Lenses 24, substantially similar to illumination lenses 10 as described above, are situated 100 mm apart on circuit board 25, along the x-direction, which is the horizontal, long axis of a high-definition television screen. Also note from FIG. 19 that the long axis of the asymmetric internal cavity is oriented to be perpendicular to the 200 mm direction.

Figure 20:
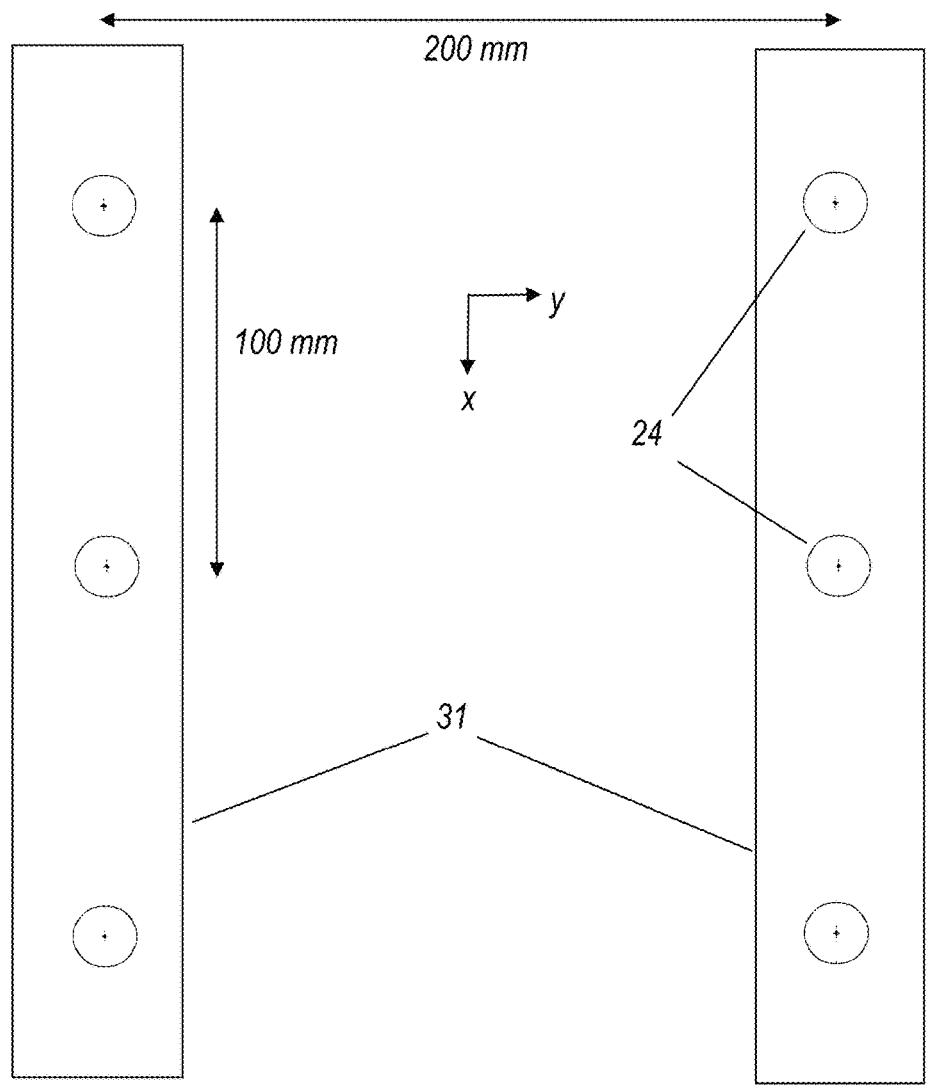
FIG. 20 is a top view of the rectangular array of lenses in the light box laid out for an asymmetric lens format according to the present exemplary embodiment.

FIG. 20 shows the spatial arrangement of the lenses 24 as shown in FIG. 19, note that for a typical 32 inch LCD television set whose surface area is approximately 700 mm by 400 mm, there may be six lenses 24 spanning the long direction and three rows of lenses spanning the 400 mm direction. It should be noted that in the fabrication of these backlight panels that the PCB material may be a dark green or black color to help absorb unwanted Fresnel reflections from the bottom of the lenses or in some instances the lenses can be coated on the bottom surface with a highly absorbing black paint. Moreover, a large sheet of white or highly reflecting diffuse material with predetermined cutout holes will overlay the PCBs 31 and allow the lenses 24 to penetrate therethrough. The lenses 24 have two or more legs (not shown) extending from the bottom thereof and into the PCB substrate, to affix the lenses 24 permanently in place with respect to the PCB 31 and ensure that the non-rotationally symmetrical inner cavity is oriented correctly in order to optimally disperse the rectangular light emission pattern from the lenses 24.

Figure 21:
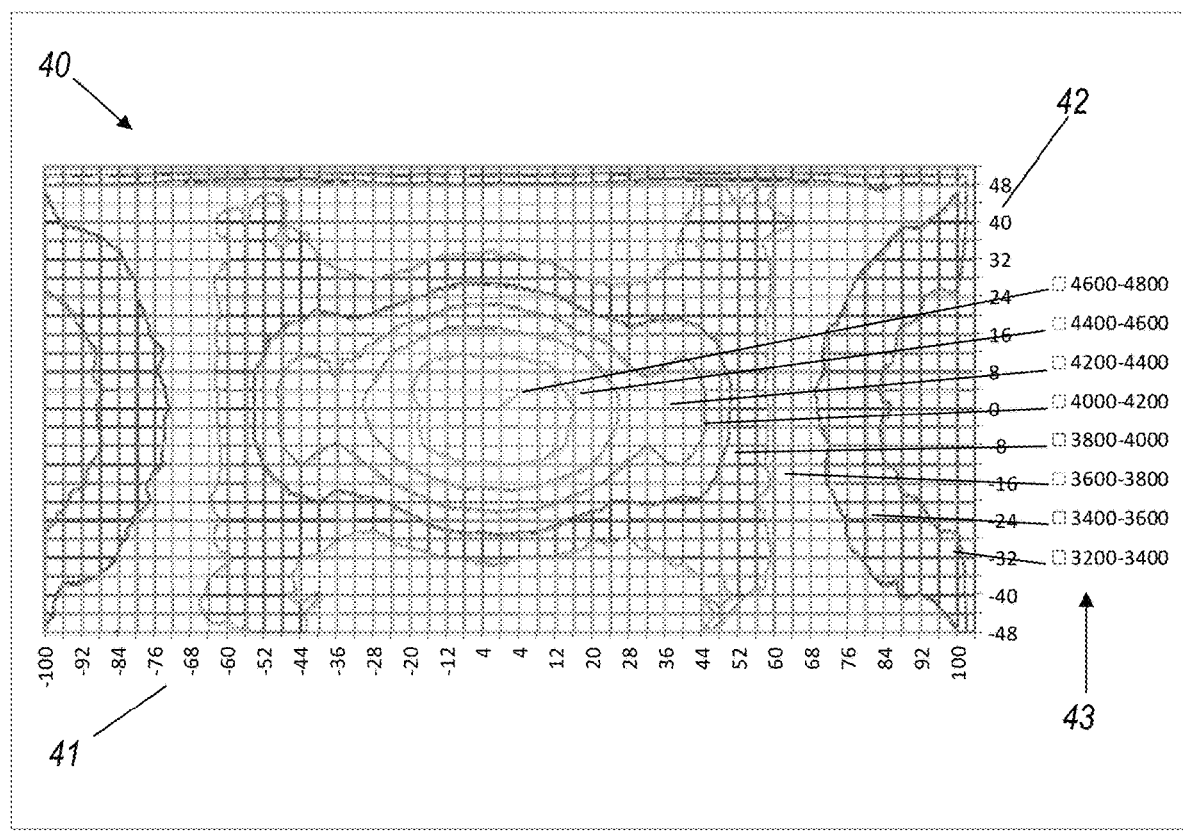
FIG. 21 is a contour map of output illumination without the smoothing effect of the micro-pyramidal faceted structure on the bottom surface of a lens according to an exemplary embodiment of the present invention.

FIG. 21 shows a perspective view of contour map 40, showing the lux results of a 10 million-ray simulation in the commercial ray-tracing package Photopia, for the illumination lens 10 shown in FIG. 18 and a 125-lumen LED manufactured by Seoul Semiconductor Co., Ltd. This graph depicts the lux levels attained atop the film stack 23 of the light box 20 shown in FIG. 19. The x-axis 41 and y-axis 42 are graduated in millimeters. Legend 43 shows the various illumination lux-zones for a lens located at the center. This contour map 40 is prior to the smoothing that a bottom surface diffuser or faceted pyramidal array will impart to improve illumination uniformity.

Figure 22:
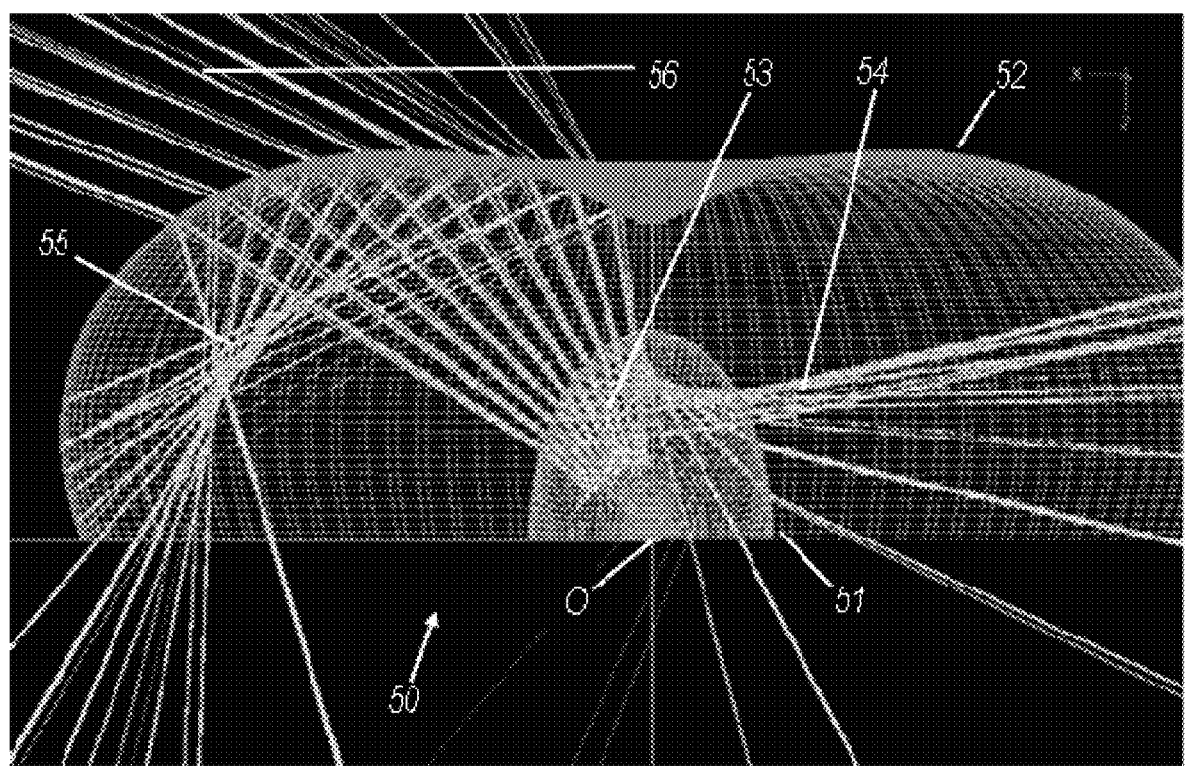
FIG. 22 shows Fresnel-reflected rays both interior to and exterior to the lens according to an exemplary embodiment of the present invention, when viewed from along the +x-direction.

FIG. 22 is a ray diagram depicting the behavior of Fresnel-reflected rays. Lens 50, substantially the same as illumination lens 10 of FIG. 18, has interior surface 51 and exterior surface 52. Diagnostic radial ray fan 53 comprises rays that proceed from the coordinate origin O (the position of an LED chip) to interior surface 51, whence a portion of their flux is reflected to become Fresnel rays 54. These rays are deflected outwards to proceed to exterior surface 52, whence a portion of their flux is reflected to become Fresnel rays 55, while most of that flux is deflected further outwards to become direct illumination rays 56. Not shown in FIG. 22 is how both sets of Fresnel rays can produce unwanted additions to the illumination pattern produced by rays 56. The Fresnel rays will reflect off the circuit board (as in FIG. 18E) and become a localized source with a short-range pattern close to the lens. This is the reason for the central cusp 14 at the top center of the lens, since the direct illumination pattern has a central dark zone that compensates for the excess central illumination by the Fresnel rays. The lens 50 is constructed using the method as taught in U.S. Pat. No. 7,674,019, and is hereby included in its entirety by reference.

The narrow light-box geometry shown in FIG. 19 results in large lateral deflections by the lens surfaces, which leads to stronger Fresnel rays. The 200 mm board spacing shown in FIG. 20 gives rise to very large incidence angles of rays hitting the film stack 23 of FIG. 19. Strong lateral intensity can be obtained by sufficient lens height, but such height is cramped by the desired thinness of the light box 20, making the height of the film stack 23 above the LEDs, relative to the lens 24 separation, a very important parameter. Making the lens 24 larger than the size disclosed according to exemplary embodiments herein may become self-defeating, due to the closeness of the film stack target.

Exemplary embodiments of the present invention disclose using non axial-symmetric lens cavities as well as outer lens shapes. When these inner and outer lens surfaces are coordinated the emitted radiation pattern can more closely approach the desired 16:9 geometry for the newer types of LCD displays. In addition, fewer LEDs may need to be used to do the same job that rotationally symmetric lenses can obtain, which allows for lower manufacturing costs and savings in fewer LEDs and lenses when the unique non-rotationally symmetric (free-form or anamorphic) architecture according to the exemplary embodiments of the present invention is employed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A surface light source apparatus, comprising:
   light emitting elements disposed on a printed circuit board (PCB); and
   illumination lenses disposed over the light emitting elements, respectively, each of the illumination lenses including:
      an internal surface having an arch shaped 2-fold and non-4-fold rotational symmetric, elongated horizontal cross-section, and configured to intercept light emitted by the light emitting element; and
      a 2-fold and non-4-fold rotational symmetric external surface having a central cusp,
   wherein the PCB has a shape elongated in a first direction, and
   wherein the horizontal cross-section of the internal surface of the illumination lens is elongated in the first direction.

2. The surface light source apparatus of claim 1, wherein the internal surface cross-section of the illumination lens has a length to width ratio at its base of about 2.5:1.

3. The surface light source apparatus of claim 1, wherein:
   the external surface is horizontally elongated in the same direction as the elongated horizontal cross-section of the internal surface; and
   the external surface has a length to width ratio of 16:15.

4. The surface light source apparatus of claim 1, wherein the illumination lens comprises a transparent material having a refractive index in a range of 1.45 to 1.65.

5. The surface light source apparatus of claim 1, wherein the illumination lens further includes a bottom surface that interconnects the internal surface and the external surface.

6. The surface light source apparatus of claim 5, wherein the bottom surface is configured to absorb Fresnel reflections from the internal surface.

7. The surface light source apparatus of claim 1, further comprising:
   a light diffusion member disposed on a side surface of the external surface of the illumination lens; and
   a reflecting diffusive sheet disposed on the PCB,
   wherein the reflecting diffusive sheet comprises a hole configured to allow light emitted from the illumination lens to escape, and the reflecting diffusive sheet is configured to block Fresnel reflections that occur outside of the illumination lens.

8. The surface light source apparatus of claim 1, comprising a plurality of PCBs arranged parallel to each other at a first interval,
   wherein the light emitting elements are arranged on each PCB at a second interval less than the first interval.

9. The surface light source apparatus of claim 8, wherein:
   the internal surfaces of the illumination lenses comprise elongated horizontal cross-sections, respectively; and
   the horizontal cross-sections of the internal surfaces are elongated in the first direction.

10. A display apparatus, comprising:
    a surface light source apparatus; and
    an illumination target member configured to receive light from the surface light source apparatus,
    wherein the surface light source apparatus comprises:
       light emitting elements disposed on a printed circuit board (PCB); and
       illumination lenses disposed over the light emitting elements, respectively,
    wherein the illumination lens comprises:
       an internal surface configured to intercept light emitted by the light emitting element, the internal surface comprising an arch shaped 2-fold and non-4-fold rotational symmetric, elongated horizontal cross-section; and
       a 2-fold and non-4-fold rotational symmetric external surface comprising a central cusp,
    wherein the PCB has a shape elongated in a first direction, and
    wherein the horizontal cross-section of the internal surface is elongated in the first direction.

11. The display apparatus of claim 10, wherein the internal surface cross-section of the illumination lens has a length to width ratio at its base of 2.5:1.

12. The display apparatus of claim 10, wherein:
the external surface is horizontally elongated in the same direction as the elongated horizontal cross-section of the internal surface; and
the external surface has a length to width ratio of 16:15.

13. The display apparatus of claim 10, wherein the illumination lens further includes a bottom surface that interconnects the internal surface and the external surface.

14. The display apparatus of claim 13, wherein the bottom surface is configured to absorb Fresnel reflections from the internal surface.

15. The display apparatus of claim 10, further comprising:
a light diffusion member disposed on a side surface of the external surface of the illumination lens; and
a reflecting diffusive sheet disposed on the PCB,
wherein the reflecting diffusive sheet comprises a hole configured to allow light emitted from the illumination lens to escape, and the reflecting diffusive sheet is configured to block Fresnel reflections that occur outside of the illumination lens.

16. The display apparatus of claim 10, further comprising a plurality of PCBs arranged parallel to each other at a first interval,
wherein:
the light emitting elements are arranged on each PCB at a second interval less than the first interval;
the internal surfaces of the illumination lenses include elongated horizontal cross-sections, respectively; and
the horizontal cross-sections of the internal surfaces are elongated in the first direction.

* * * * *